US009430292B2

(12) United States Patent
Ono

(10) Patent No.: US 9,430,292 B2
(45) Date of Patent: Aug. 30, 2016

(54) INFORMATION PROCESSING SYSTEM, METHOD OF CONTROLLING INFORMATION PROCESSING SYSTEM AND STORAGE MEDIUM

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/632,575

(22) Filed: Feb. 26, 2015

(65) Prior Publication Data

US 2015/0309841 A1 Oct. 29, 2015

(30) Foreign Application Priority Data

Apr. 24, 2014 (JP) ................. 2014-090271

(51) Int. Cl.
*G06F 9/455* (2006.01)
*G06F 9/46* (2006.01)
*G06F 9/50* (2006.01)

(52) U.S. Cl.
CPC ......... *G06F 9/5027* (2013.01); *G06F 9/45558* (2013.01); *G06F 9/5016* (2013.01); *G06F 9/45533* (2013.01); *G06F 9/50* (2013.01); *G06F 9/5083* (2013.01); *G06F 2009/45575* (2013.01)

(58) Field of Classification Search
CPC ........ G06F 9/485; G06F 9/50; G06F 9/5083; G06F 9/45533
See application file for complete search history.

(56) References Cited

U.S. PATENT DOCUMENTS

| 2007/0198721 A1 | 8/2007 | Ikawa et al. |
| 2009/0150463 A1 | 6/2009 | Sekiguchi et al. |
| 2010/0031258 A1 | 2/2010 | Takano et al. |
| 2012/0072685 A1* | 3/2012 | Otani ................. G06F 11/1451 711/162 |
| 2014/0165063 A1* | 6/2014 | Shiva ..................... G06F 21/57 718/1 |

FOREIGN PATENT DOCUMENTS

| JP | 2007-219964 | 8/2007 |
| JP | 2009-145931 | 7/2009 |
| JP | 2010-33404 | 2/2010 |

* cited by examiner

*Primary Examiner* — Camquy Truong
(74) *Attorney, Agent, or Firm* — Staas & Halsey LLP

(57) ABSTRACT

An information processing system includes: a plurality of processors configured to cause a virtual machine on each processor to be operated or terminated; a plurality of storage devices; and a control device configured to: collect processing loads of the respective processors, cause a first virtual machine which operates on a first processor in which a frequency of a processing load exceeding a first threshold exceeds a first proportion, to be terminated, cause a second processor which is stopped among the plurality of processors, to be operated, and cause a first storage device which is coupled with the terminated first virtual machine among the plurality of storage devices, to be coupled with the operated second processor.

13 Claims, 22 Drawing Sheets

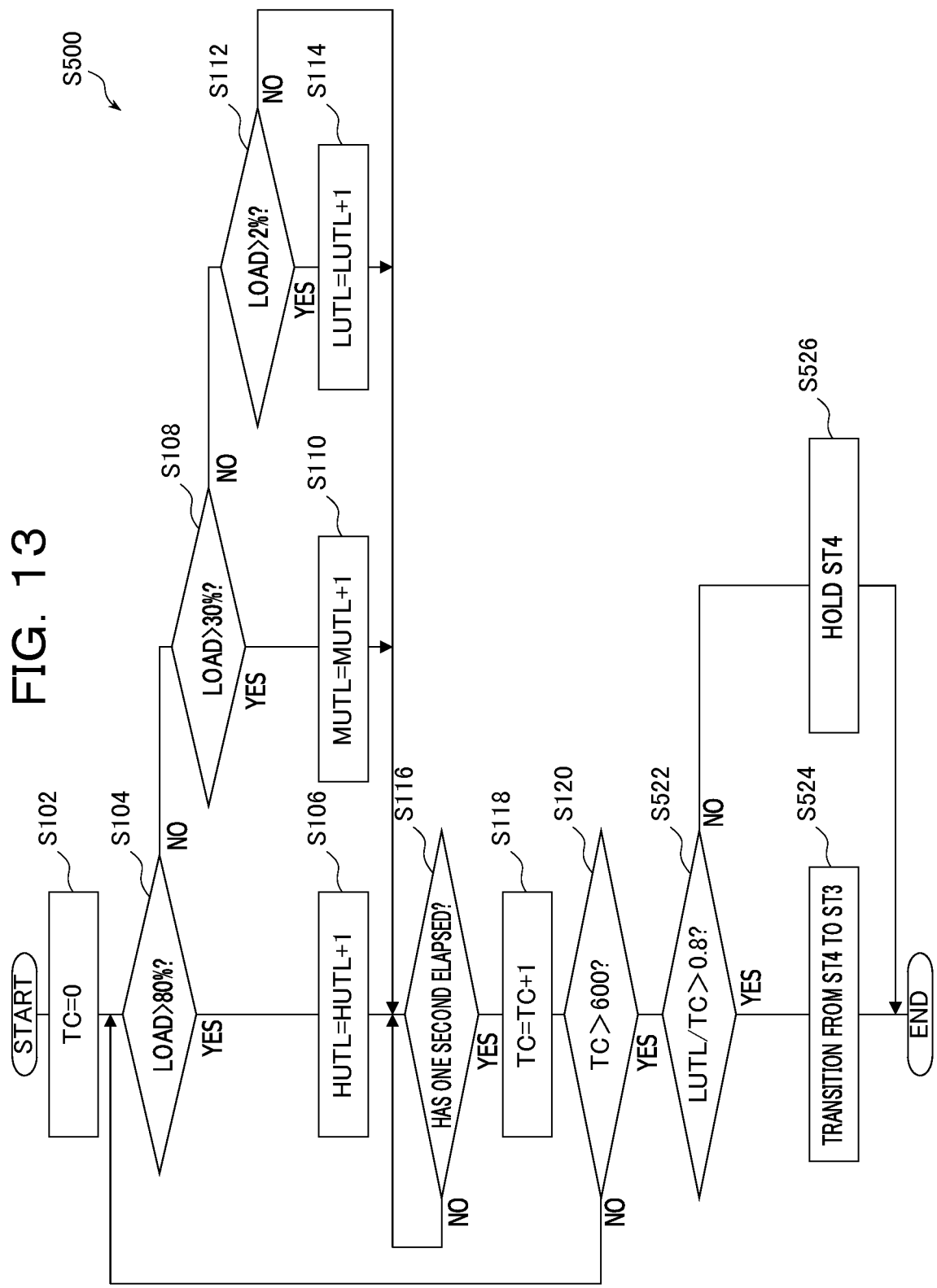

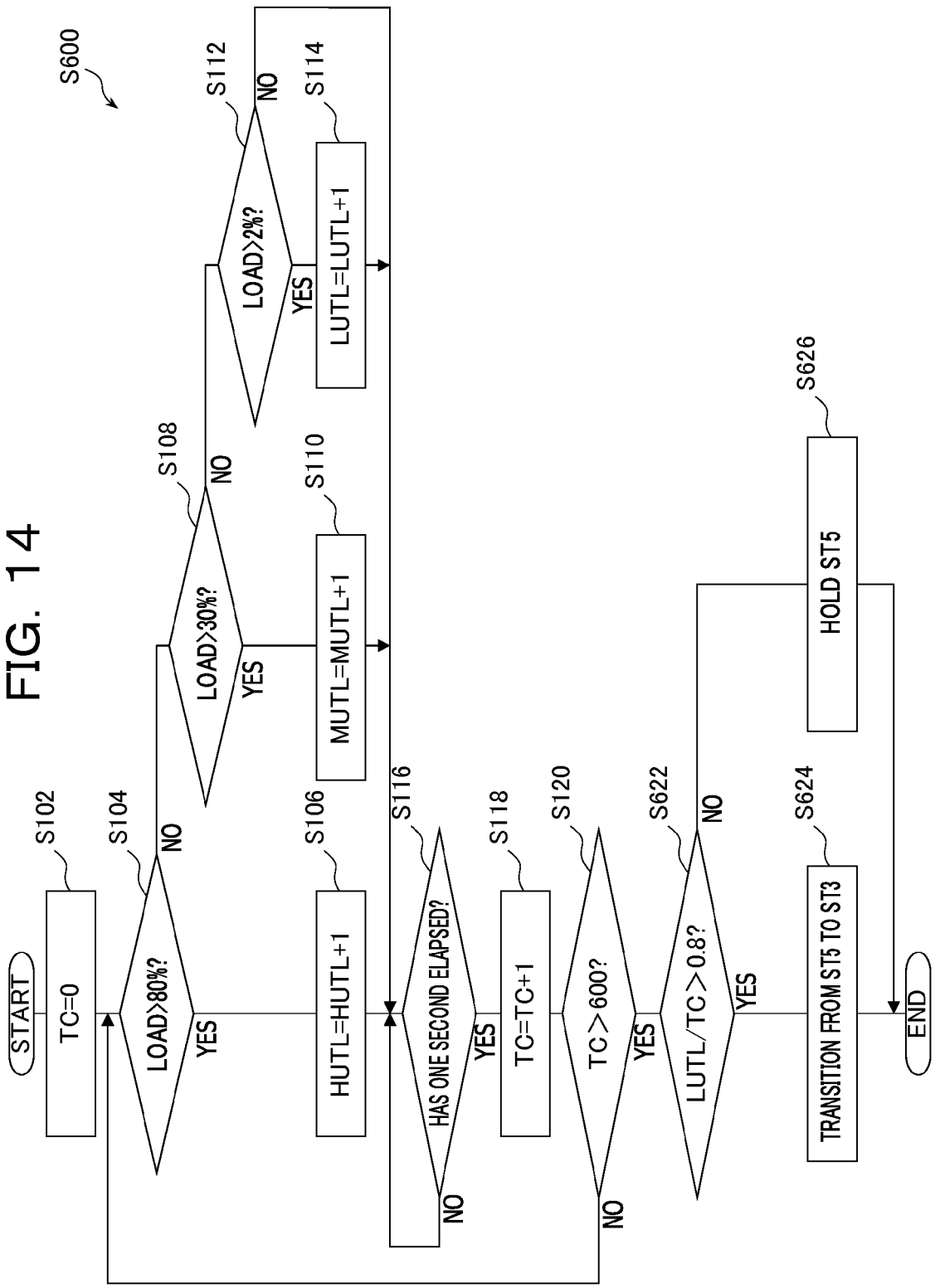

FIG. 15

```
1   DEFINE HTH 80%                                           //THRESHOLD VALUE OF LOAD
2   DEFINE MTH 30%                                           //THRESHOLD VALUE OF LOAD
3   DEFINE LTH 2%                                            //THRESHOLD VALUE OF LOAD
4   DEFINE TIME 600                                          //COLLECTING PERIOD (SECOND) FOR COLLECTING LOAD INFORMATION OF PHYSICAL SERVER
5   DEFINE RPEXP 0.9                                         //FREQUENCY (THRESHOLD VALUE) OF LOAD FOR DETERMINING ADDITION OF PHYSICAL SERVER
6   DEFINE RVEXP 0.8                                         //FREQUENCY (THRESHOLD VALUE) OF LOAD FOR DETERMINING REPLACEMENT OF VIRTUAL SERVER WITH PHYSICAL SERVER
7   DEFINE RVNEW 0.7                                         //FREQUENCY (THRESHOLD VALUE) OF LOAD FOR DETERMINING ADDITION OF VIRTUAL SERVER
8   DEFINE RSH 0.8                                           //FREQUENCY (THRESHOLD VALUE) OF LOAD FOR DETERMINING REMOVAL OF VIRTUAL SERVER
9   DEFINE RVRM 0.9                                          //FREQUENCY (THRESHOLD VALUE) OF LOAD FOR DETERMINING REPLACEMENT OF PHYSICAL SERVER WITH VIRTUAL SERVER
10
11  if (State == 0) {
12      for (TC=0; TC < TIME; TC++) {                        //S102, S116, S118, S120
13          if (measureCpuUtil > HTH)                        //S104
14              HUTL++                                       //S106
15          elseif (measureCpuUtil > MTH)                    //S108
16              MCPUTUTL++                                   //S110
17          else (measureCpuUtil < LTH)                      //S112
18              LUTL++                                       //S114
19      }
20      if (MUTL/TC > RVEXP)
21          do transState(0→1)                               //S122
22      else
23          do transState(0→0)                               //S124
                                                             //S126
24  }
```

FIG. 16

```
1   DEFINE HTH 80%        //THRESHOLD VALUE OF LOAD
2   DEFINE MTH 30%        //THRESHOLD VALUE OF LOAD
3   DEFINE LTH 2%         //THRESHOLD VALUE OF LOAD
4   DEFINE TIME 600       //COLLECTING PERIOD (SECOND) FOR COLLECTING LOAD INFORMATION OF PHYSICAL SERVER
5   DEFINE RPEXP 0.9      //FREQUENCY (THRESHOLD VALUE) OF LOAD FOR DETERMINING ADDITION OF PHYSICAL SERVER
6   DEFINE RVEXP 0.8      //FREQUENCY (THRESHOLD VALUE) OF LOAD FOR DETERMINING REPLACEMENT OF VIRTUAL SERVER WITH PHYSICAL SERVER
7   DEFINE RVNEW 0.7      //FREQUENCY (THRESHOLD VALUE) OF LOAD FOR DETERMINING ADDITION OF VIRTUAL SERVER
8   DEFINE RSH 0.8        //FREQUENCY (THRESHOLD VALUE) OF LOAD FOR DETERMINING REMOVAL OF VIRTUAL SERVER
9   DEFINE RVRM 0.9       //FREQUENCY (THRESHOLD VALUE) OF LOAD FOR DETERMINING REPLACEMENT OF PHYSICAL SERVER WITH VIRTUAL SERVER
10
11  if (State == 1) {
12      for (TC=0; TC < TIME; TC++){                  //S102, S116, S118, S120
13          if (measureCpuUtil > HTH)                 //S104
14              HUTL++                                //S106
15          elseif (measureCpuUtil > MTH)             //S108
16              MCPUTUTL++                            //S110
17          else (measureCpuUtil < LTH)               //S112
18              LUTL++                                //S114
19      }
20      if (MUTL/TC > RVEXP)
21          do transState(1→2)                        //S222
22      elseif (LUTL/TC > VSH)                        //S224
23          do transState(1→0)                        //S226
24      else                                          //S228
25          do transState(1→1)                        //S230
26  }
```

FIG. 17

```
1   DEFINE HTH 80%        //THRESHOLD VALUE OF LOAD
2   DEFINE MTH 30%        //THRESHOLD VALUE OF LOAD
3   DEFINE LTH 2%         //THRESHOLD VALUE OF LOAD
4   DEFINE TIME 600       //COLLECTING PERIOD (SECOND) FOR COLLECTING LOAD INFORMATION OF PHYSICAL SERVER
5   DEFINE RPEXP 0.9      //FREQUENCY (THRESHOLD VALUE) OF LOAD FOR DETERMINING ADDITION OF PHYSICAL SERVER
6   DEFINE RVEXP 0.8      //FREQUENCY (THRESHOLD VALUE) OF LOAD FOR DETERMINING REPLACEMENT OF VIRTUAL SERVER WITH PHYSICAL SERVER
7   DEFINE RVNEW 0.7      //FREQUENCY (THRESHOLD VALUE) OF LOAD FOR DETERMINING ADDITION OF VIRTUAL SERVER
8   DEFINE RSH 0.8        //FREQUENCY (THRESHOLD VALUE) OF LOAD FOR DETERMINING REMOVAL OF VIRTUAL SERVER
9   DEFINE RVRM 0.9       //FREQUENCY (THRESHOLD VALUE) OF LOAD FOR DETERMINING REPLACEMENT OF PHYSICAL SERVER WITH VIRTUAL SERVER
10
11  if (State == 2) {
12      for (TC=0; TC < TIME; TC++){    //S102, S116, S118, S120
13          if (measureCpuUtil > HTH)   //S104
14              HUTL++                   //S106
15          elseif (measureCpuUtil > MTH) //S108
16              MCPUTUTL++               //S110
17          else (measureCpuUtil < LTH)  //S112
18              LUTL++                   //S114
19      }
20      if (HUTL/TC > RPEXP)             //S322
21          do transState(2→4)           //S324
22      elseif (MUTL/TC > RVNEW)
23          do transState(2→3)           //S326
24      elseif (LUTL/TC > RSH)           //S328
25          do transState(2→1)           //S330
26      else                             //S332
27          do transState(2→2)           //S334
28  }
```

FIG. 18

```
1   DEFINE HTH 80%         //THRESHOLD VALUE OF LOAD
2   DEFINE MTH 30%         //THRESHOLD VALUE OF LOAD
3   DEFINE LTH 2%          //THRESHOLD VALUE OF LOAD
4   DEFINE TIME 600        //COLLECTING PERIOD (SECOND) FOR COLLECTING LOAD INFORMATION OF PHYSICAL SERVER
5   DEFINE RPEXP 0.9       //FREQUENCY (THRESHOLD VALUE) OF LOAD FOR DETERMINING ADDITION OF PHYSICAL SERVER
6   DEFINE RVEXP 0.8       //FREQUENCY (THRESHOLD VALUE) OF LOAD FOR DETERMINING REPLACEMENT OF VIRTUAL SERVER WITH PHYSICAL SERVER
7   DEFINE RVNEW 0.7       //FREQUENCY (THRESHOLD VALUE) OF LOAD FOR DETERMINING ADDITION OF VIRTUAL SERVER
8   DEFINE RSH 0.8         //FREQUENCY (THRESHOLD VALUE) OF LOAD FOR DETERMINING REMOVAL OF VIRTUAL SERVER
9   DEFINE RVRM 0.9        //FREQUENCY (THRESHOLD VALUE) OF LOAD FOR DETERMINING REPLACEMENT OF PHYSICAL SERVER WITH VIRTUAL SERVER
10
11  if (State == 3) {
12      for (TC=0; TC < TIME; TC++){               //S102, S116, S118, S120
13          if (measureCpuUtil > HTH)              //S104
14              HUTL++                             //S106
15          elseif (measureCpuUtil > MTH)          //S108
16              MCPUTUTL++                         //S110
17          else (measureCpuUtil < LTH)            //S112
18              LUTL++                             //S114
19      }
20      if (MUTL/TC > RVEXP)
21          do transState(3→5)                     //S422
22      elseif (LUTL/TC > RVRM)                    //S424
23          do transState(3→2)                     //S426
24      else                                       //S428
25          do transState(3→3)                     //S430
26  }
```

FIG. 19

```
1   DEFINE HTH 80%         //THRESHOLD VALUE OF LOAD
2   DEFINE MTH 30%         //THRESHOLD VALUE OF LOAD
3   DEFINE LTH 2%          //THRESHOLD VALUE OF LOAD
4   DEFINE TIME 600        //COLLECTING PERIOD (SECOND) FOR COLLECTING LOAD INFORMATION OF PHYSICAL SERVER
5   DEFINE RPEXP 0.9       //FREQUENCY (THRESHOLD VALUE) OF LOAD FOR DETERMINING ADDITION OF PHYSICAL SERVER
6   DEFINE RVEXP 0.8       //FREQUENCY (THRESHOLD VALUE) OF LOAD FOR DETERMINING REPLACEMENT OF VIRTUAL SERVER WITH PHYSICAL SERVER
7   DEFINE RVNEW 0.7       //FREQUENCY (THRESHOLD VALUE) OF LOAD FOR DETERMINING ADDITION OF VIRTUAL SERVER
8   DEFINE RSH 0.8         //FREQUENCY (THRESHOLD VALUE) OF LOAD FOR DETERMINING REMOVAL OF VIRTUAL SERVER
9   DEFINE RVRM 0.9        //REQUENCY (THRESHOLD VALUE) OF LOAD FOR DETERMINING REPLACEMENT OF PHYSICAL SERVER WITH VIRTUAL SERVER
10
11  if (State == 4) {                              //S102, S116, S118, S120
12      for (TC=0; TC < TIME; TC++){               //S104
13          if (measureCpuUtil > HTH)              //S106
14              HUTL++                             //S108
15          elseif (measureCpuUtil > MTH)          //S110
16              MCPUTUTL++                         //S112
17          else (measureCpuUtil < LTH)            //S114
18              LUTL++
19      }
20      if (LUTL/TC > RSH)                         //S522
21          do transState(4→3)                     //S524
22      else
23          do transState(4→4)                     //S526
24  }
```

FIG. 20

```
1  DEFINE HTH 80%                  //THRESHOLD VALUE OF LOAD
2  DEFINE MTH 30%                  //THRESHOLD VALUE OF LOAD
3  DEFINE LTH 2%                   //THRESHOLD VALUE OF LOAD
4  DEFINE TIME 600                 //COLLECTING PERIOD (SECOND) FOR COLLECTING LOAD INFORMATION OF PHYSICAL SERVER
5  DEFINE RPEXP 0.9                //FREQUENCY (THRESHOLD VALUE) OF LOAD FOR DETERMINING ADDITION OF PHYSICAL SERVER
6  DEFINE RVEXP 0.8                //FREQUENCY (THRESHOLD VALUE) OF LOAD FOR DETERMINING REPLACEMENT OF VIRTUAL SERVER WITH PHYSICAL SERVER
7  DEFINE RVNEW 0.7                //FREQUENCY (THRESHOLD VALUE) OF LOAD FOR DETERMINING ADDITION OF VIRTUAL SERVER
8  DEFINE RSH 0.8                  //FREQUENCY (THRESHOLD VALUE) OF LOAD FOR DETERMINING REMOVAL OF VIRTUAL SERVER
9  DEFINE RVRM 0.9                 //FREQUENCY (THRESHOLD VALUE) OF LOAD FOR DETERMINING REPLACEMENT OF PHYSICAL SERVER WITH VIRTUAL SERVER
10 if (State == 5) {
11   for (TC=0; TC < TIME; TC++){                                  //S102, S116, S118, S120
12     if (measureCpuUtil > HTH)                                   //S104
13       HUTL++                                                    //S106
14     elseif (measureCpuUtil > MTH)                               //S108
15       MCPUTUTL++                                                //S110
16     else (measureCpuUtil < LTH)                                 //S112
17       LUTL++                                                    //S114
18   }
19   if (LUTL/TC > RSH)
20     do transState(5→3)                                          //S622
21   else
22     do transState(5→5)                                          //S624
23                                                                 //S626
24 }
```

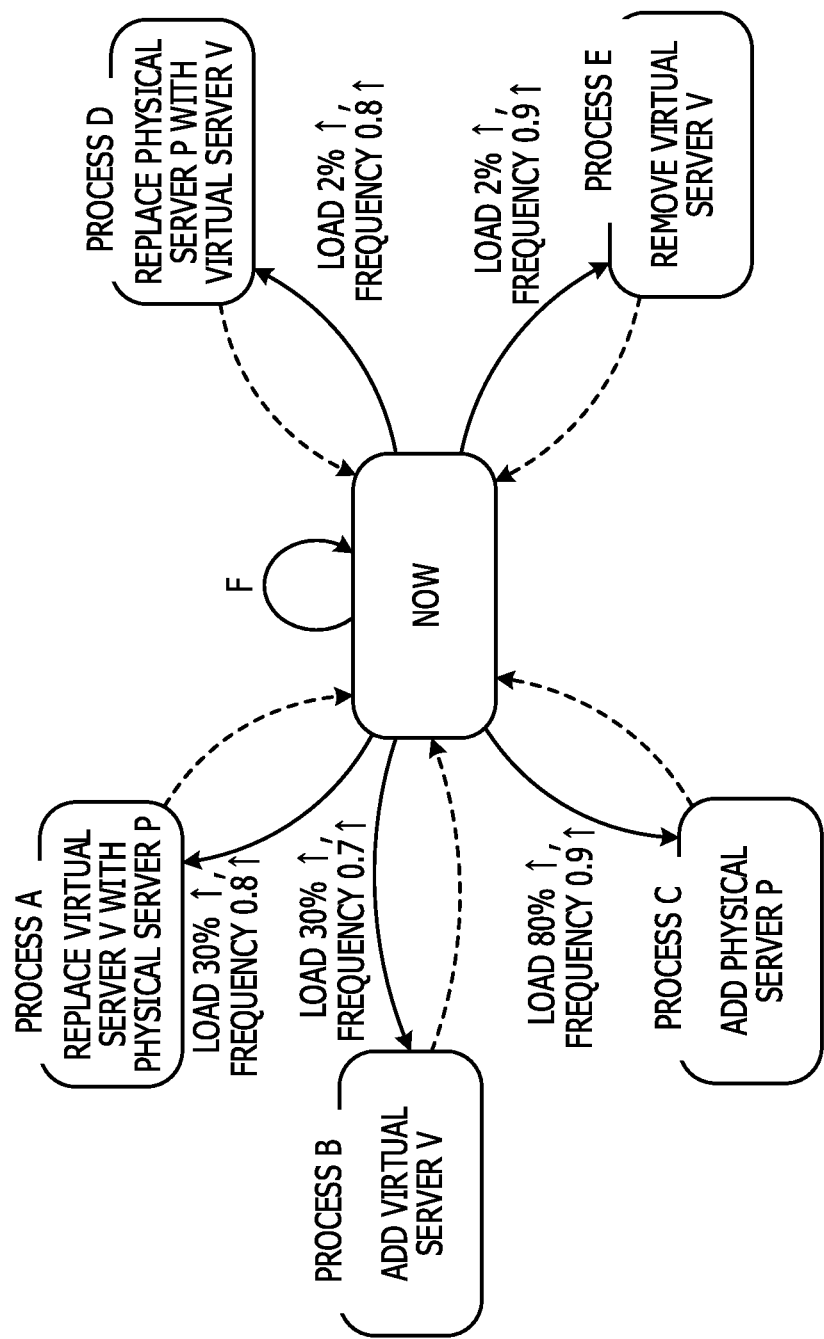

INFORMATION PROCESSING SYSTEM, METHOD OF CONTROLLING INFORMATION PROCESSING SYSTEM AND STORAGE MEDIUM

CROSS-REFERENCE TO RELATED APPLICATION

This application is based upon and claims the benefit of priority of the prior Japanese Patent Application No. 2014-090271, filed on Apr. 24, 2014, the entire contents of which are incorporated herein by reference.

FIELD

The embodiments discussed herein are related to an information processing system, a method of controlling the information processing system, and a storage medium.

BACKGROUND

When a virtual computation machine defined on a computation machine is moved to another computation machine, information used in a process executed by the virtual computation machine is sent to an external storage device and then is moved to the other computation machine.

In a system including a plurality of server devices, each executing a process based on a request, session information included in a server device having a load larger than that of another server device is moved to another server device so as to decentralize the load.

When a process of a virtual computation machine operated on a computation machine is executed by a virtual computation machine on another computation machine, configuration information on a storage interface and the like of the original virtual computation machine is set in the virtual computation machine defined on the other computation machine, and then the virtual computation machine defined on the other computation machine is operated. For example, the original virtual computation machine is stopped and a new virtual computation machine is suppressed from starting an operation during a time period when configuration information is exchanged between the original virtual computation machine and the new virtual computation machine.

Examples of the related art include Japanese Laid-open Patent Publication No. 2009-145931, Japanese Laid-open Patent Publication No. 2007-219964, and Japanese Laid-open Patent Publication No. 2010-33404.

SUMMARY

According to an aspect of the invention, an information processing system includes: a plurality of processors configured to cause a virtual machine on each processor to be operated or terminated; a plurality of storage devices; and a control device configured to: collect processing loads of the respective processors, cause a first virtual machine which operates on a first processor in which a frequency of a processing load exceeding a first threshold exceeds a first proportion, to be terminated, cause a second processor which is stopped among the plurality of processors, to be operated, and cause a first storage device which is coupled with the terminated first virtual machine among the plurality of storage devices, to be coupled with the operated second processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an example of an ST4 control routine;
FIG. 14 illustrates an example of an ST5 control routine;
FIG. 15 illustrates an example of a program of executing the ST0 control routine;
FIG. 16 illustrates an example of a program of executing the ST1 control routine;
FIG. 17 illustrates an example of a program of executing the ST2 control routine;
FIG. 18 illustrates an example of a program of executing the ST3 control routine;
FIG. 19 illustrates an example of a program of executing the ST4 control routine;
FIG. 20 illustrates an example of a program of executing the ST5 control routine;
FIG. 21 illustrates an example in which a control device changes the state of an information processing apparatus in another embodiment of the information processing system, the control method of the information processing system, and the control program of the information processing system.

DESCRIPTION OF EMBODIMENTS

For example, when a server device executing information processing is switched to another server device or when a server device is added, a process of switching or adding causes a load of the server device to increase. For this reason, it is preferable that switching and adding of a server device are executed before a load of a server device exceeds a predetermined threshold, in order to suppress degradation of a service provided by the server device. It is preferable that a type of a switched server device or an added server device is selected in accordance with the extent that a load of the server device changes.

The object of an information processing system, a control method of the information processing system, and a recording medium in which a control program of the information processing system is recorded, according to this disclosure is to change processing performance of the information processing system depending on a change of a load without an influence on a service provided by the information processing system.

Hereinafter, embodiments will be described using the drawings.

Figure 1:
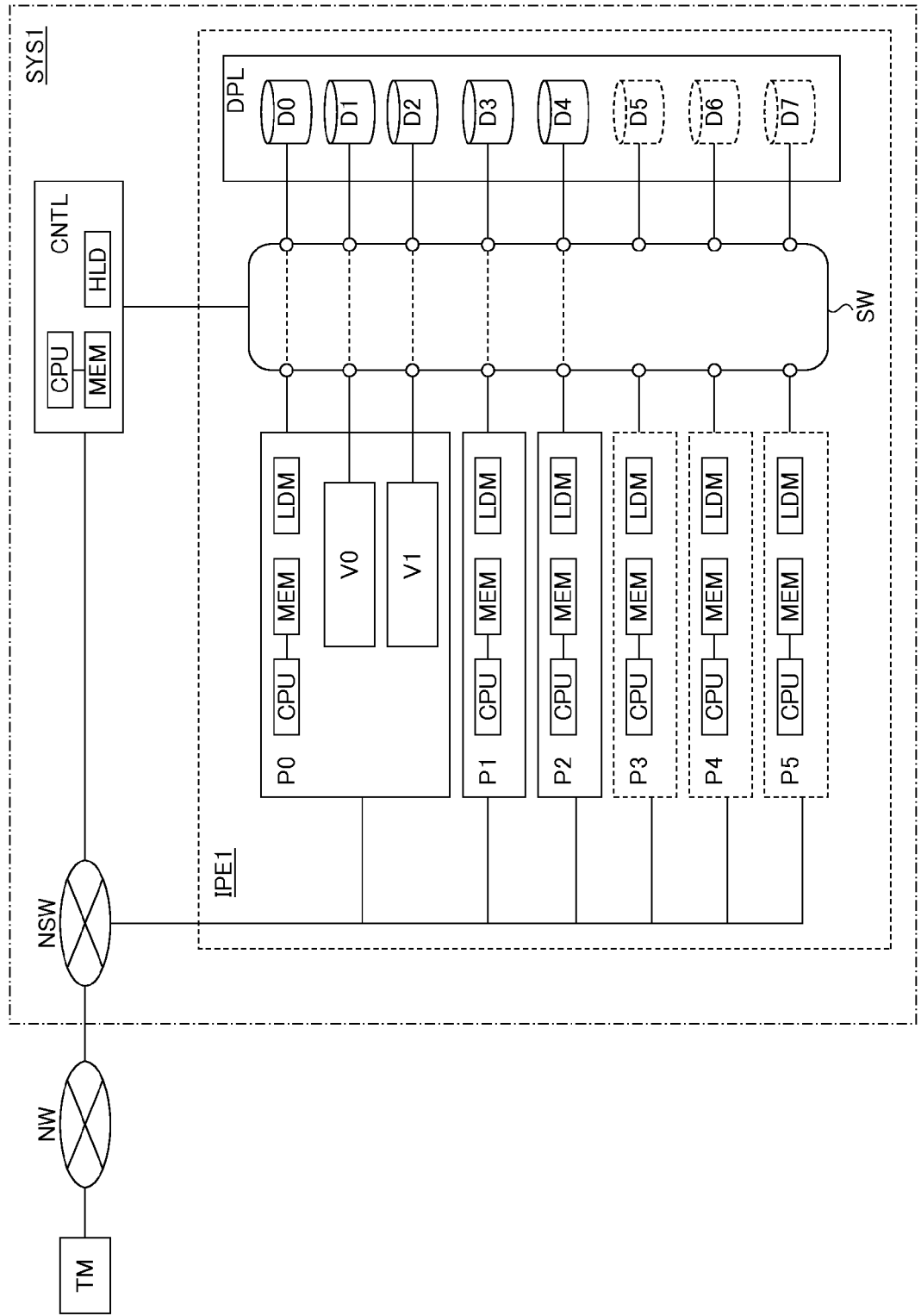
FIG. 1 illustrates an embodiment of an information processing system, a control method of the information processing system, and a control program of the information processing system.

FIG. 1 illustrates an embodiment of an information processing system, a control method of the information processing system, and a control program of the information processing system. An information processing system SYS1 according to this embodiment includes an information processing apparatus IPE1 and a control device CNTL configured to control the information processing apparatus IPE1. The information processing apparatus IPE1 includes a plurality of servers P (P0, P1, P2, P3, P4, and P5), a switch device SW, and a disk pool DPL. For example, each server P and the control device CNTL are coupled with each other through a network switch NSW such as Ethernet (registered trademark). For example, each server P and the control device CNTL are coupled with a user terminal TM which uses the information processing system SYS1 as a network storage, through the network switch NSW. For example, the user terminal TM is coupled with the information processing system SYS1 through a network NW such as the Internet or an intranet. For example, the information processing system SYS1 functions as a storage server or a data center for holding information such as data, transmitted from the user terminal TM. For example, information transmitted from the user terminal TM may be stored in duplicate in each of a plurality of storage devices D (for example, three storage devices D).

Each server P is operated based on control of the control device CNTL and is stopped based on control of the control device CNTL. The servers P0, P1, and P2 indicated by solid lines represent the operating servers and the servers P3, P4, and P5 indicated by dot lines represent the stopped servers. The currently stopped servers P3, P4, and P5 are to be operated based on an instruction from the control device CNTL. For example, the currently stopped servers P3, P4, and P5 are in a state where power is cut off. The number of servers P is not limited to six. The server P is an example of an information processing section.

Each server P includes a processor such as a central processing unit (CPU) and a storage device such as a memory MEM for storing an operating system (OS) executed by the processor and a program which is for implementing a function of the server. Each server P may include a storage device such as a hard disk drive (HDD), for storing the program. The OS or the program executed by each server P may be stored in the storage device D disposed in the disk pool DPL and may be transmitted to the memory MEM of the server P based on an operating instruction received from the control device CNTL.

Each server P includes a monitoring section LDM for monitoring its own load. The monitoring section LDM is, for example, a load monitoring agent. The monitoring section LDM monitors a load of the CPU at a predetermined interval and notifies the control device CNTL of the monitored load as load information indicating a load of each server P. For example, a "load of a CPU" refers to CPU usage (for example, an average value) monitored by the monitoring section LDM for a predetermined period (for example, one second). The monitoring section LDM may monitor input/output (I/O) usage (for example, an access rate of the storage device D) instead of the CPU usage. The monitoring section LDM may be implemented through a program which is executed by the CPU and may be implemented by hardware. Additionally, the monitoring section LDM may be implemented by combining a program and hardware.

A plurality of virtual machines V (V0 and V1) for implementing a function of the server using software may be mounted in each server P. FIG. 1 illustrates an example in which the virtual machines V0 and V1 are operated on the server P0. The number of virtual machines V allowed to be operated on each server P is not limited to two. In the following description, the server P physically mounted in the information processing system SYS1 is referred to as a physical server P and the virtual machine V installed on the physical server P is referred to as a virtual server V.

The disk pool DPL includes a plurality of storage devices D (D0 to D7). For example, the storage device D refers to an HDD or a solid state drive (SSD), but may refer to other storage devices capable of holding information in a non-volatile manner. For example, the storage devices D0 to D4 indicated by solid lines represent a state where power is supplied and information such as data is written and read. The storage devices D5 to D7 indicated by dot lines represent a state where the power is cut off and information is not written and read. For example, information such as data is deleted in the storage devices D5 to D7 indicated by dot lines. The power may be supplied to the storage devices D5 to D7 in which information is not written and read. For example, supply and cutting of the power in the storage devices D0 to D7 is controlled by the control device CNTL. The number of the storage devices D0 to D7 is not limited to eight. The storage device D is an example of a storage section.

The switch device SW couples the storage device D with the physical server P or the virtual server V based on control of the control device CNTL. A dot line seen inside the switch device SW indicates a state in which the storage device D is coupled with the physical server P or the virtual server V. For example, the switch device SW may couple an arbitrary storage device D with the physical server P or the virtual server V based on control from the control device CNTL. In FIG. 1, for easily understandable description, one storage device D is coupled with one physical server P or one virtual server V. However, a plurality of storage devices D may be coupled with one physical server P or one virtual server V. The switch device SW is an example of a coupling section. A disk area network or a storage area network (SAN) for coupling the storage device D with the physical server P or the virtual server V is constructed in the information processing apparatus IPE1 by using the switch device SW.

The switch device SW has performance sufficient for coupling the storage device D with the physical server P or the virtual server V without a band (data transmission speed) of the storage device D being reduced. The storage device D is operated as a direct attached storage (DAS). That is, performance of the storage device D which is coupled with the physical server P or the virtual server V through the switch device SW is equal to performance of a storage device such as an HDD, mounted in the physical server P. Since the virtual server V is implemented through a program which is executed by the physical server P, access efficiency of the storage device D by the virtual server V is lower than access efficiency of the storage device D by the physical server P.

The control device CNTL includes a processor such as a CPU and a storage device such as a memory MEM, for storing an OS executed by the processor and a program which is for implementing a function of the control device CNTL. The program which is stored in the memory MEM and executed by the CPU of the control device CNTL refers to a control program for controlling an operation of the information processing system SYS1. The control method of the information processing system SYS1 is implemented through the program which is stored in the memory MEM and executed by the CPU of the control device CNTL.

The control device CNTL includes a holding section HLD for holding the load information of each server P transferred from the monitoring section LDM of the server P. For example, the holding section HLD may be implemented by using registers mounted in the CPU of the control device CNTL and may be held in the memory MEM of the control device CNTL. The control device CNTL may include a storage device such as an HDD, for storing a program.

In the example illustrated in FIG. 1, the physical servers P0, P1, P2 are operated. The storage device D0 is coupled with the physical server P0, the storage device D3 is coupled with the physical server P1, and the storage device D4 is coupled with the physical server P2. The virtual servers V0 and V1 are operated on the physical server P0, the storage device D1 is coupled with the virtual server V0, and the storage device D2 is coupled with the virtual server V1. In FIG. 1, the physical servers P0, P1, and P2 and the virtual servers V0 and V1 operate five servers and the information processing system SYS1 is operated as a storage server or a data center, for example.

The monitoring section LDM of each of the physical servers P0, P1, and P2 in operation monitors a load of the CPU periodically and transmits the load information indicating the monitored load to the control device CNTL. The control device CNTL holds the received load information in the holding section HLD. The control device CNTL controls to switch the virtual server V to the physical server P or to switch the physical server P to the virtual server V, based on the load information of each of the physical servers P0, P1, and P2 in operation, which is held in the holding section HLD. The control device CNTL controls to add a virtual server V, to add a physical server P, or to delete a virtual server V. The control method of the information processing system SYS1 executed by the control device CNTL will be described using FIGS. 3 to 20.

For example, the control device CNTL controls to equally write information such as file data and image data, which is transmitted from the user terminal TM in the storage devices D respectively coupled with servers which include the physical server P and the virtual server V. For example, the storage devices D respectively coupled with servers which include the physical server P and the virtual server V are disposed in a hash space evenly. In other words, the control device CNTL assigns information to the servers such as data such that loads of the physical server P in operation and the virtual server V in operation are equal to each other. A parent server which is any one of the physical servers P in operation may assign information such as data (that is, designation of a server which transmits information such as data). Information including data and the like is simply referred to as data below.

Access performance of the virtual server V accessing the storage device D is lower than access performance of the physical server P accessing the storage device D. For this reason, a load of the virtual server V may be smaller than a load of the physical server P by the number of storage devices D coupled with the virtual server V being less than the number of the storage device D coupled with the physical server P. A load of the virtual server V may be smaller than a load of the physical server P by a hash space allocated to the storage device D coupled with the virtual server V being smaller than a hash space allocated to the storage device D coupled with the physical server P.

Figure 2:
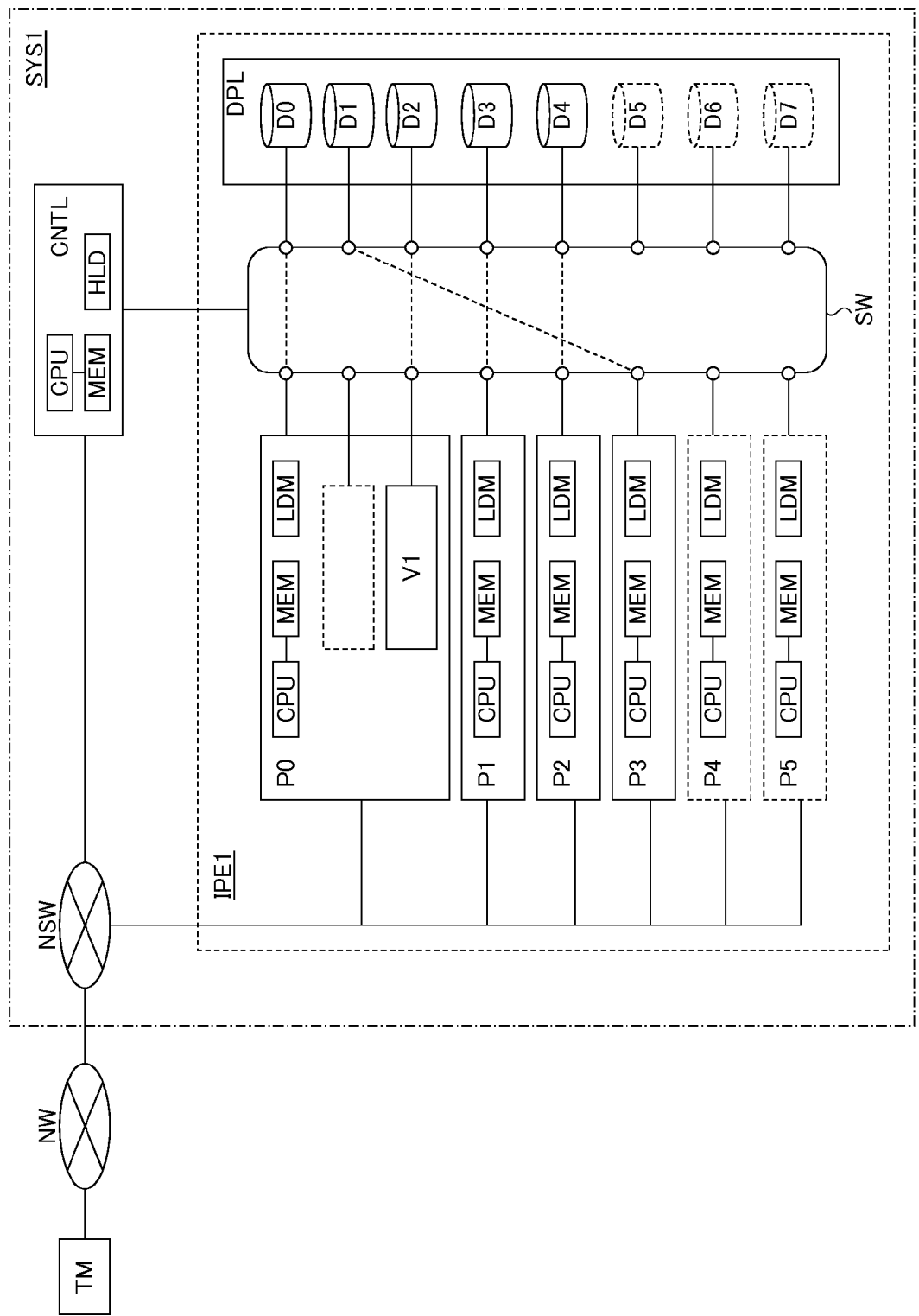
FIG. 2 illustrates an example of a state of the information processing apparatus different from a state illustrated in FIG. 1.

FIG. 2 illustrates an example of a state of the information processing apparatus IPE1 different from a state of the information processing apparatus IPE1 illustrated in FIG. 1. For example, in FIG. 2, the virtual server V0 (FIG. 1) which has operated on the physical server P0 is removed, the stopped physical server P3 starts to be operated, and the storage device D1 which has been coupled with the virtual server V0 is coupled with the physical server P3. That is, FIG. 2 illustrates an example in which the virtual server V0 (FIG. 1) is switched to the physical server P3 based on a change of a load in any one of the physical servers P0, P1, and P2. A rectangle indicated by a dot line in the physical server P0 means that a program for implementing the virtual server V0 illustrated in FIG. 1 is terminated and an operation of the virtual server V0 on the physical server P0 is terminated.

Switching the virtual server V0 to the physical server P3 is performed by exchanging configuration information (for example, a host name which is a unique name of the server and an internet protocol (IP) address) of the physical server P3 and configuration information of the virtual server V0, for example. At this time, the control device CNTL controls the switch device SW to separate the storage device D1 from the virtual server V0 and to couple the separated storage device D1 with the physical server P3.

For example, the control device CNTL changes a state of the information processing apparatus IPE1 to a state illustrated in FIG. 2 from a state illustrated in FIG. 1 when a frequency of a load in any one of the physical servers P0 to P2 to the maximum load applied to each physical server P being more than 30% and equal to or less than 80% exceeds a predetermined proportion. For example, the frequency refers to a proportion of the number of pieces of load information which indicates a load of more than 30% and equal to or less than 80% to the number of pieces of load information which is held in the holding section HLD and is transmitted to each of the physical servers P0, P1, and P2.

Figure 3:
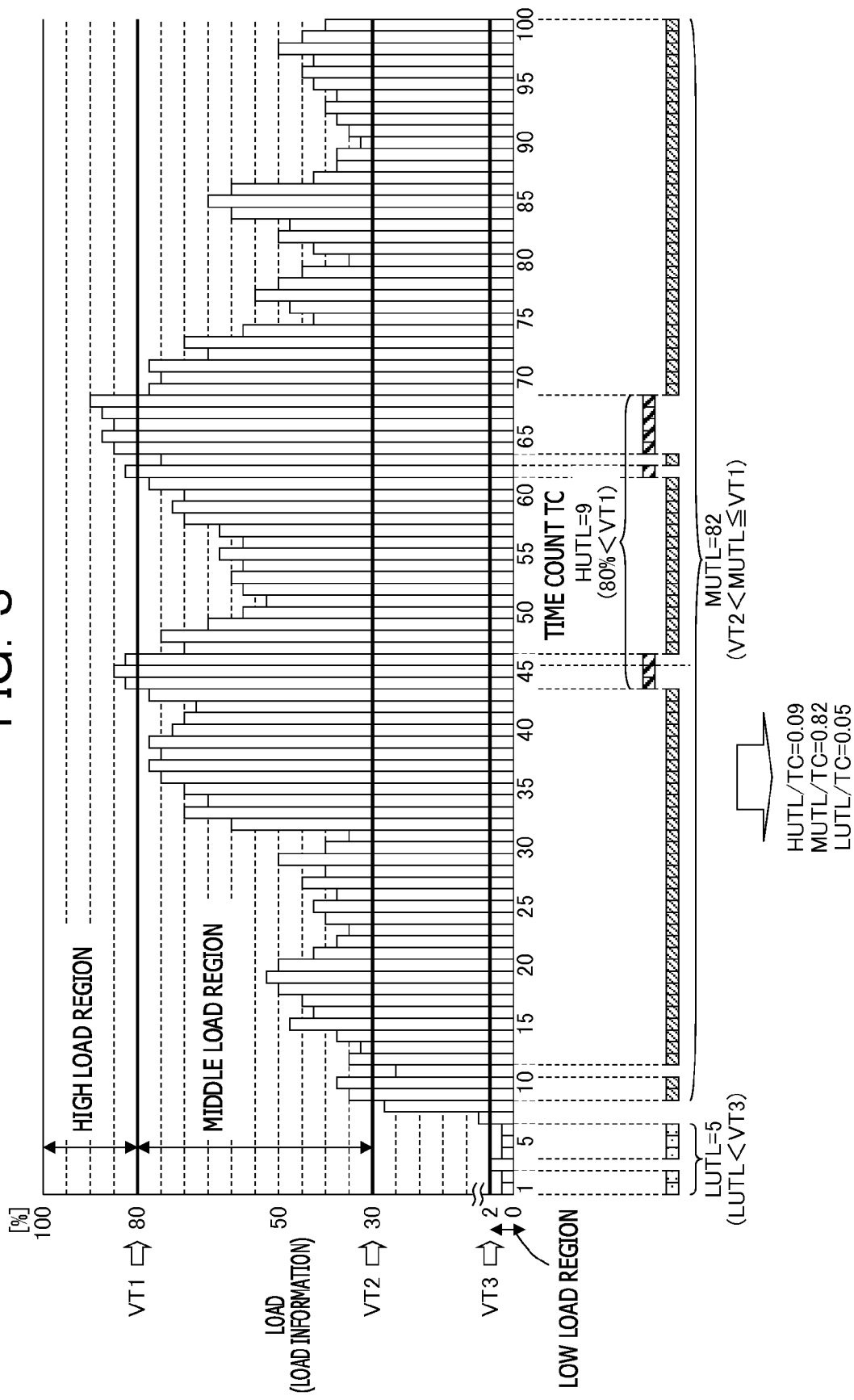
FIG. 3 illustrates an example in which a control device collects load information.

FIG. 3 illustrates an example in which the control device CNTL illustrated in FIG. 1 collects load information. For example, each bar of a bar graph illustrated on an upper side of FIG. 3 indicates load information of which the control device CNTL is notified by one monitoring section LDM of the physical server P in operation. In the example illustrated in FIG. 3, the control device CNTL holds 100 pieces of load information received by the physical server P in the holding section HLD. The load information indicates a load (any value from 0% to 100%) of the CPU mounted in the physical server P performing notification of the load information. In FIG. 3, for easily understandable description, the load information is indicated by the bar graph. However, the server P notifies the control device CNTL of the load information as a load value in practice. For example, the monitoring section LDM notifies the control device CNTL of the load information once a second. For this reason, a time count TC which is indicated on a horizontal axis of FIG. 3 and refers to the number of notifications of the load information also indicates the number of seconds.

The control device CNTL compares load values indicated by the load information held in the holding section HLD with threshold values VT1, VT2, and VT3 each time load information is received 100 times from each operating physical server P. For example, the threshold value VT1 refers to 80%, the threshold value VT2 refers to 30%, and the threshold value VT3 refers to 2%. The threshold values VT1, VT2, and VT3 may refer to other values as long as the threshold values VT1, VT2, and VT3 satisfy a relationship of VT1>VT2>VT3 and the number of pieces of load information to be compared is not limited to 100. For example, in an example of a processing flow illustrated in FIGS. 9 to 14, the control device CNTL compares each load value indicated by each piece of load information held in the holding section HLD with the threshold values VT1, VT2, and VT3 each time the load information is received 600 times (that is, for each 600 seconds).

The control device CNTL increases a variable LUTL by "one" when a load indicated by the load information is less than the threshold value VT3. The control device CNTL increases a variable MUTL by "one" when a load indicated by the load information is more than the threshold value VT2 and equal to or less than the threshold value VT1. The control device CNTL increases a variable HUTL by "one" when a load indicated by the load information exceeds the threshold value VT1. The variables LUTL, MUTL, and HUTL are assigned to each physical server P.

The values of variables LUTL, MUTL, and HUTL are initialized to "0" before the load information is collected. For example, when the control device CNTL collects the load information in a unit of 100 seconds (TC=100), the variables LUTL, MUTL, and HUTL are initialized for each 100 seconds. In the following description, a region of exceeding the threshold value VT1 (80%) is also referred to as a high load region, a region of more than the threshold value VT2 (30%) and equal to or less than the threshold value VT1 (80%) is also referred to as a middle load region, and a region of less than the threshold value VT3 (2%) is also referred to as a low load region.

In FIG. 3, the variable LUTL has a value of "5", the variable MUTL has a value of "82", and the variable HUTL has a value of "9" in a state where the control device CNTL collects the load information 100 times. The control device CNTL divides the values of the variables LUTL, MUTL, and HUTL by a value (=100) of the time count TC to obtain the frequency of the load (ratio of time) at each of the high load region, the middle load region, and the low load region for a predetermined period (for example, 100 seconds). For example, in the example illustrated in FIG. 3, the frequency of the load at the high load region is "0.09", the frequency of the load at the middle load region is "0.82", and the frequency of the load at the low load region is "0.05". The frequency of the load refers to a proportion of loads distributed at a load region having a predetermined range. A relationship of the frequency of the load indicated by the variables LUTL, MUTL, and HUTL which are assigned to each of the plurality of physical servers P which are operating will be described with reference to FIG. 4.

As illustrated in FIGS. 9 to 14, the control device CNTL determines whether or not a result of collecting the load information satisfies the following five conditions of Condition A to Condition E.

(Condition A) the frequency of the load at the middle load region exceeds "0.8".
(Condition B) the frequency of the load at the middle load region exceeds "0.7"
(Condition C) the frequency of the load at the high load region exceeds "0.9".
(Condition D) the frequency of the load at the low load region exceeds "0.8".
(Condition E) the frequency of the load at the low load region exceeds "0.9".

Figure 5:
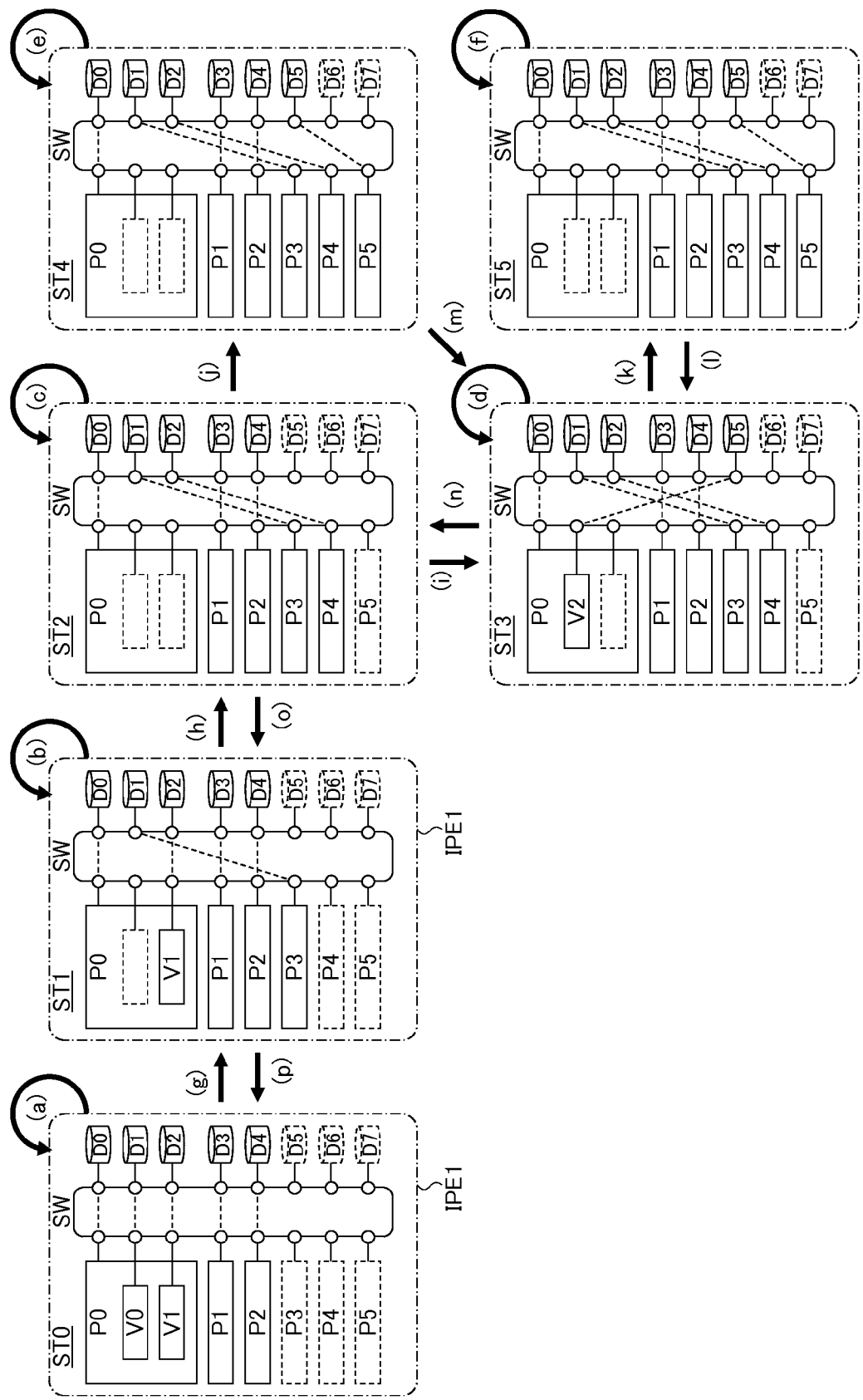
FIG. 5 illustrates an example of an operation of the information processing system.

The control device CNTL controls the physical server P, the virtual server V, and the switch device SW based on a state of the information processing apparatus IPE1 including information such as the number of the operating physical servers P and the number of the operating virtual servers V. FIG. 5 illustrates an example in which the control device CNTL controls the physical server P, the virtual server V, and the switch device SW. As illustrated in FIG. 5, the condition used for determination is different in accordance with states ST0 to ST5 of the information processing apparatus IPE1.

Figure 4:
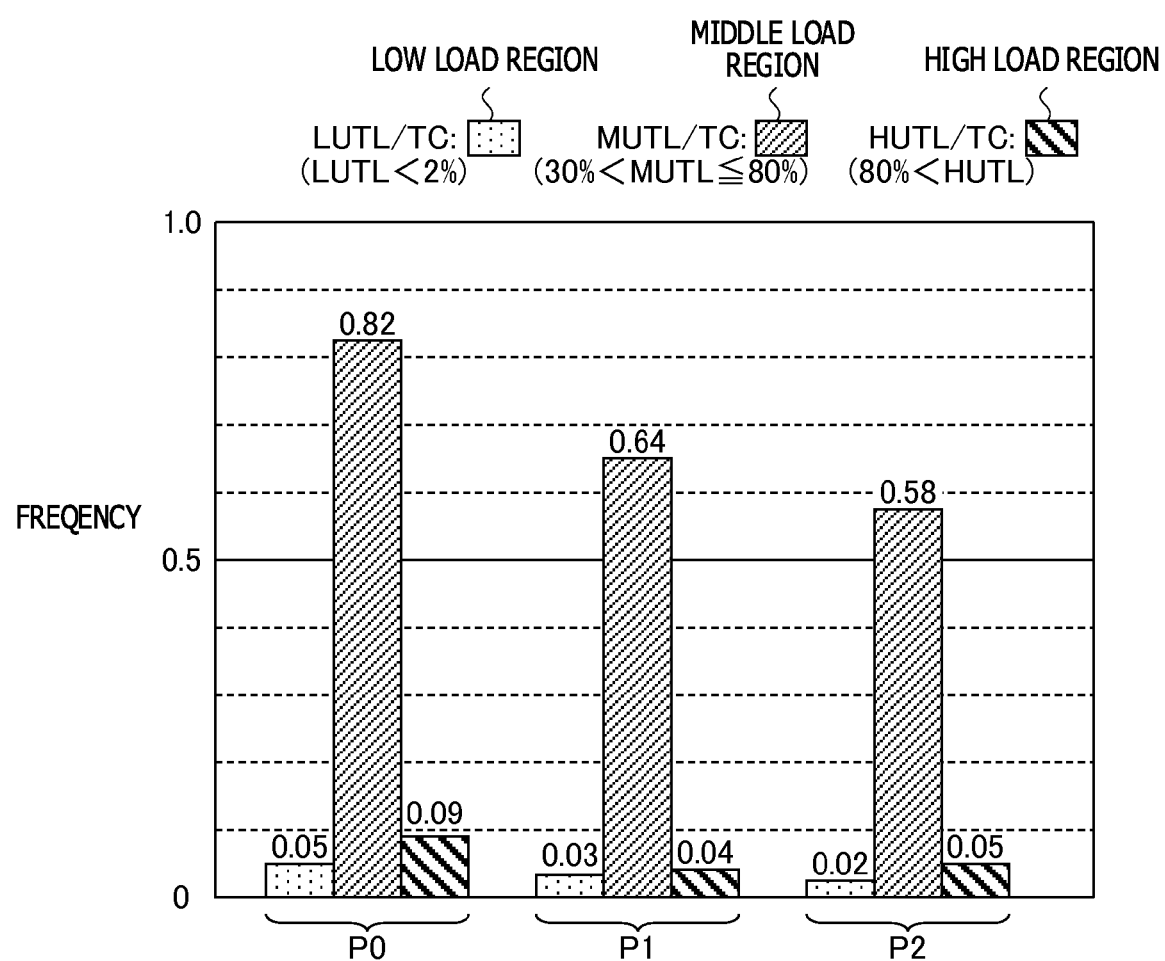
FIG. 4 illustrates an example of frequency of load information in each physical server, collected by the control device.

FIG. 4 illustrates an example of the frequency of the load information of each of the physical servers P0, P1, and P2, collected by the control device CNTL illustrated in FIG. 1. FIG. 4 illustrates an example of the frequency of the load information when the control device CNTL detects that (Condition A) illustrated in FIG. 3 is satisfied and changes a state of the information processing apparatus IPE1 to the state illustrated in FIG. 2 from the state illustrated in FIG. 1.

For example, when the storage devices D are disposed evenly using a hash space, it is highly likely that changes of the load in the respective physical servers P in operation have a tendency to be similar to each other. For this reason, the frequency of the load of one operating physical server P at the low load region, the middle load region, and the high load region has a similar tendency as the frequency of the load of another operating physical server P at the low load region, the middle load region, and the high load region. For example, when the frequency of the load of one operating physical server P at the middle load region is high, the frequency of the load of another operating physical server P at the middle load region also is high.

The load of the physical server P including the operating virtual server V is higher than the load of the physical server P not including the virtual server V. For example, the frequency of the load at each of the high load region, the middle load region, and the low load region in the physical server P0 causing the two virtual servers V0 and V1 to be operated in the state illustrated in FIG. 1 is higher than the frequency of the load at each of the high load region, the middle load region, and the low load region in the others physical servers P1 and P2. For this reason, for example, it is much likely that each of (Condition A), (Condition B), and (Condition C) illustrated in FIG. 3 is satisfied based on the frequency of the load of the physical server P causing the virtual server V to be operated.

FIG. 5 illustrates an example of an operation of the information processing system SYS1 illustrated in FIG. 1. That is, FIG. 5 illustrates an example of the control method of the information processing system SYS1 performed by the control device CNTL.

In the example illustrated in FIG. 5, the state of the information processing apparatus IPE1 is changed between the states ST0, ST1, ST2, ST3, ST4, and ST5. The state ST0 refers to a state illustrated in FIG. 1 and the state ST1 refers to a state illustrated in FIG. 2. When the load of the physical server P in operation does not satisfy a condition for changing the state in each of the states ST0 to ST5, the state is held (marks of (a), (b), (c), (d), (e), and (f) in FIG. 5). The operation of the information processing system SYS1 is not limited to the example illustrated in FIG. 5. That is, the number of the states ST0 to ST5 is not limited to six and specifications of transitions between the states are not limited to the example illustrated in FIG. 5.

For example, when the frequency of the load included at the middle load region exceeds "0.8" in the state ST0 and in any one of the physical servers P0 to P2 (Condition A), the state of the information processing apparatus IPE1 is changed to the state ST1 (the mark (g) in FIG. 5). In this case, the virtual server V0 which has operated on the physical server P0 is terminated, the physical server P3 which has been stopped starts to be operated, and the storage device D1 which has been coupled with the virtual server V0 is coupled with the physical server P3. That is, the virtual server V0 is replaced with the physical server P3. The number of servers operated in the information processing apparatus IPE1 and in the state ST1 is five and is the same as that in the state ST0. However, performance of the information processing apparatus IPE1 is improved by replacing the virtual server V0 with the physical server P3. That the performance of the information processing apparatus IPE1 is improved without changing the number of servers is also referred to as scale-out for performance or is also simply referred to as scale-out in the following description.

The virtual server V1 may be replaced with the physical server P3 for changing the state ST0 to the state ST1. When the virtual server V is operated on the physical server P1 or P2, the virtual server V operated on the physical server P1 or P2 may be replaced with the physical server P3.

When the load of the physical server P tends to increase, the control device CNTL performs scale-out of replacing the virtual server V0 to the physical server P3 and thus it is possible to increase a processing capacity of the information processing apparatus IPE1. Accordingly, it is possible to stably operate the information processing apparatus IPE1 even when the load of the information processing apparatus IPE1 further increases after that. Since the storage device D1 which has been coupled with the virtual server V0 is coupled with the physical server P3, transition of data between the storage devices D does not occur and thus it is possible to hold allocation of the storage device D1 to the hash space.

The configuration information such as an IP address is changed between the virtual server V0 and the physical server P3 with switching from the virtual server V0 to the physical server P3. For this reason, an increment of the load of the information processing apparatus IPE1 by switching from the virtual server V0 to the physical server P3 is smaller than an increment of the load when data is transitioned. The scale-out performed by switching the servers is performed in a state where the load of the physical server P tends to increase. Thus, an increase of the load by switching the servers does not have an influence on a service provided by the information processing system SYS1. Accordingly, an increase of the load of the information processing apparatus IPE1 due to switching the servers is minimized and thus it is possible to improve processing performance of the information processing system SYS1 without an influence on a service provided by the information processing system SYS1.

When the frequency of the load included at the middle load region exceeds "0.8" in the state ST1 and in any one of the physical servers P0 to P3 (Condition A), the state of the information processing apparatus IPE1 is changed to the state ST2 (the mark (h) in FIG. 5). In this case, the virtual server V1 which has operated on the physical server P0 is terminated, the physical server P4 which has been stopped starts to be operated, and the storage device D2 which has been coupled with the virtual server V1 is coupled with the physical server P4. Switching the virtual server V1 to the physical server P4 is performed by exchanging configuration information (for example, a host name and an IP address) of the physical server P4 and configuration information of the virtual server V1 and switching the coupling of the storage device D1 from the virtual server V0 to the physical server P0, for example.

Improvement of performance of the information processing apparatus IPE1 caused by performing scale-out from the state ST1 to the state ST2 is similar to improvement of performance of the information processing apparatus IPE1 caused by changing the state ST0 to the state ST1. It is possible to obtain the same effect as through scale-out from the state ST0 to the state ST1 for performance by performing scale-out from the state ST1 to the state ST2 for performance. The virtual server V replaced with the physical server P4 is not limited to the virtual server V1, similarly to the change of the state ST0 to the state ST1.

When the frequency of the load included at the middle load region exceeds "0.7" in the state ST2 and in any one of the physical servers P0 to P4 (Condition B), the state of the information processing apparatus IPE1 is changed to the state ST3 (the mark (i) in FIG. 5). In this case, a new virtual server V2 is operated on the physical server P0 and a new storage device D5 is coupled with the virtual server V2. That is, scale-out of adding the virtual server V2 to the information processing apparatus IPE1 is performed. Since the new storage device D5 is added, reallocation of the hash space is performed for the storage devices D0 to D5 respectively coupled with the physical servers P0 to P4 in operation and the virtual server V2 in operation, for example. The reallocation of the hash space results in transition of data between the storage devices D0 to D5. The virtual server V operated on the physical servers P1 to P4 may be added to the information processing apparatus IPE1 instead of the virtual server V2, for changing the state ST2 to the state ST3.

The control device CNTL adds the new virtual server V2 in the load being low when a tendency of increasing in the load of the physical server P is lower than a tendency of increasing in the load when the state ST0 is changed to the state ST1. Accordingly, it is possible to include the new virtual server V2 when the load of the information processing apparatus IPE1 is further increased. Since data is transitioned between the storage devices D in the load being low, it is possible to have a reduced influence on the information processing apparatus IPE1 due to transition of data, compared to when the load is high and thus data is transitioned.

When the frequency of the load of any one of the physical servers P0 to P4 included at the high load region exceeds "0.9" in the state ST2 (Condition C), the state of the information processing apparatus IPE1 is changed to the state ST4 (the mark (j) in FIG. 5). In this case, a new physical server P5 is operated and the new storage device D5 is coupled with the physical server P5. That is, scale-out of adding the physical server P5 to the information processing apparatus IPE1 is performed. Since the new storage device D5 is added, reallocation of the hash space is performed for the storage devices D0 to D5 respectively coupled with the physical servers P0 to P5 in operation, for example. The reallocation of the hash space results in transition of data between the storage devices D0 to D5. Improvement of performance of the information processing apparatus IPE1 caused by changing the state ST2 to the state ST4 is higher than improvement of performance of the information processing apparatus IPE1 caused by changing the state ST2 to the state ST3. The other stopped physical server P may be added to the information processing apparatus IPE1 for changing the state ST2 to the state ST4.

The control device CNTL adds a new physical server P having a processing capacity higher than that of the virtual server V when the load of the physical server P tends to increase rapidly. With this, it is possible to transition data between the storage devices D while an influence of transition of data on the information processing apparatus IPE1 is minimized. The frequency of the load may satisfy Condition A or Condition B ahead of satisfying Condition C, in a normal operation of the information processing system SYS1 in many cases. For this reason, for example, the frequency of changing the state ST2 to the state ST4 is lower than frequency of changing the state ST2 to the state ST3. A state of the information processing apparatus IPE1 in the state ST5 is the same as a state of the information processing apparatus IPE1 in the state ST4.

When the frequency of the load of any one of the physical servers P0 to P4 included at the middle load region exceeds "0.8" in the state ST3 (Condition A), the state of the information processing apparatus IPE1 is changed to the state ST5 (the mark (k) in FIG. 5). In this case, the virtual server V2 which has operated on the physical server P0 is removed, the stopped physical server P5 starts to be operated, and the storage device D5 which has been coupled with the virtual server V2 is coupled with the physical server P5, similarly to the change of the state ST0 to the state ST1. That is, scale-out for performance is performed.

Switching the virtual server V2 to the physical server P5 is performed by exchanging configuration information (for example, a host name and an IP address) of the physical server P5 and configuration information of the virtual server V2 and switching the coupling of the storage device D5 from the virtual server V2 to the physical server P5, for example.

When the frequency of the load of any one of the physical servers P0 to P5 included at the low load region exceeds "0.8" in the state ST5 (Condition D), the state of the information processing apparatus IPE1 is changed to the state ST3 (the mark (l) in FIG. 5). In this case, the physical server P5 is stopped, the virtual server V2 is operated on the physical server P0, and the storage device D5 which has been coupled with the physical server P5 is coupled with the virtual server V2. That is, the physical server P5 is replaced with the virtual server V2 and a state of the information processing apparatus IPE1 is changed in reverse to being changed from the state ST3 to the state ST5. The number of servers operated in the information processing apparatus IPE1 in the state ST4 is six and is the same as that in state ST5. However, performance of the information processing apparatus IPE1 is degraded by replacing the physical server P5 with the virtual server V2. That the performance of the information processing apparatus IPE1 is degraded without changing the number of servers is also referred to as scale-in for performance or is also simply referred to as scale-in in the following description. The physical server P5 may be replaced with the virtual server V on the physical servers P1 to P4 in operation for changing the state ST5 to the state ST3.

Switching the physical server P5 to the virtual server V2 is performed by exchanging configuration information (for example, a host name and an IP address) of the physical server P5 and configuration information of the virtual server V2 and switching the coupling of the storage device D5 from the physical server P5 to the virtual server V2, for example.

Since the storage device D5 which has been coupled with the physical server P5 is coupled with the virtual server V2, transition of data between the storage devices D does not occur and thus it is possible to hold allocation of the storage device D1 to the hash space. For this reason, transition of data held in the storage device D due to reallocation to the hash space does not occur in the entirety of the information processing apparatus IPE1. The load of all of the operating physical servers P0 to P5 is reduced in a state where the load of any one of the physical servers P0 to P5 is included at the low load region. For this reason, an increase in load due to replacing the physical server P5 with the virtual server V2 does not influence a service provided by the information processing system SYS1. Accordingly, an increase of the load of the information processing apparatus IPE1 by switching the servers is minimized and thus it is possible to degrade processing performance of the information processing system SYS1 without an influence on a service provided by the information processing system SYS1.

The control device CNTL may stop one of the physical servers P by performing scale-in for performance in which the physical server P is replaced with the virtual server V when the load of the physical server P is small. With this, it is possible to decrease a processing capacity of the information processing apparatus IPE1 and to largely reduce power consumed by the information processing apparatus IPE1, compared to when one of the physical servers P continues to be operated.

When the frequency of the load of any one of the physical servers P0 to P5 included at the low load region exceeds "0.8" in the state ST4 (Condition D), the state of the information processing apparatus IPE1 is changed to the state ST3 (the mark (m) in FIG. 5). An operation in this case is performed similarly to the change of the state ST5 to the state ST3. For example, configuration information (for example, a host name and an IP address) of the physical server P5 and configuration information of the virtual server V2 are exchanged and the coupling of the storage device D5 is switched from the physical server P5 to the virtual server V2. It is possible to obtain the same effect as the effect obtained by changing the state ST5 to the state ST3, through scale-in for performance in which the state ST4 is changed to the state ST3.

When the frequency of the load of any one of the physical servers P0 to P4 included at the low load region exceeds "0.8" in the state ST3 (Condition E), the state of the information processing apparatus IPE1 is changed to the state ST2 (the mark (n) in FIG. 5). In this case, data which is held in the storage device D5 coupled with the virtual server V2 is transitioned to other storage devices D0 to D4 and the virtual server V2 on the physical server P0 is terminated. That is, scale-in is performed. When data transmitted from the user terminal TM is held in duplicate in the plurality of storage devices D as replica data, the virtual server V2 may be terminated ahead of transitioning data. In this case, the virtual server V2 is terminated and then data may be transitioned by using the replica data read from the storage device D which is coupled with the physical servers P0 to P4 in operation or the other virtual server V in operation.

The load (Condition E) of the information processing apparatus IPE1 when the state ST3 is changed to the state ST2 is smaller than the load (Condition D) of the information processing apparatus IPE1 when the state ST5 is changed to the state ST3. For this reason, when data is transitioned between the storage devices D depending on the change of the states of the information processing apparatus IPE1, it is also possible to reduce an influence on a service provided by the information processing system SYS1 to the minimum. When Condition E is satisfied, one of the physical servers P may be stopped instead of terminating one of the virtual servers V. Accordingly, it is possible to largely reduce the power consumed by the information processing apparatus IPE1, compared to when one of the virtual servers V is terminated.

When the frequency of the load of any one of the physical servers P0 to P4 included at the low load region exceeds "0.8" in the state ST2 (Condition D), the state of the information processing apparatus IPE1 is changed to the state ST1 (the mark (o) in FIG. 5). An operation in this case is performed similarly to the change of the state ST5 to the state ST3. For example, configuration information (for example, a host name and an IP address) of the physical server P4 and configuration information of the virtual server V1 are exchanged and the coupling of the storage device D2 is switched from the physical server P4 to the virtual server V1. That is, scale-in for performance is performed.

When the frequency of the load of any one of the physical servers P0 to P3 included at the low load region exceeds "0.8" in the state ST1 (Condition D), the state of the information processing apparatus IPE1 is changed to the state ST0 (the mark (p) in FIG. 5). Scale-in for performance is performed as an operation performed in this case, similarly to the change of the state ST5 to the state ST3.

In FIG. 5, the control device CNTL replaces the virtual server V with the physical server P when the frequency of the load of the physical server P included at the middle load region increases to exceed a predetermined value. That is, when the load of the information processing apparatus IPE1 is small, the virtual server V is operated. When the load of the information processing apparatus IPE1 is large, the physical server P is operated. When the load of the information processing apparatus IPE1 is small, the virtual server V having access efficiency (I/O performance) lower than that of the physical server P is operated and thus it is possible to suppress an influence of the I/O performance of the virtual server V on a service provided by the information processing system SYS1. When data transmitted from the user terminal TM is stored in duplicate in the plurality of storage devices D, the physical server P is coupled with one of the plurality of storage devices D storing the data and thus access efficiency of data is determined based on the I/O performance of the physical server P. In this case, it is possible to cover the I/O performance of the virtual server V with the I/O performance of the physical server P.

FIG. 5 illustrates an example in which the control device CNTL changes the state of the information processing apparatus IPE1 in accordance with the frequency of the load of any one of the physical servers P. However, the control device CNTL may change the state of the information processing apparatus IPE1 in accordance with a frequency of an average value of the load of the operating physical server P. This is because the frequencies of the load of the respective operating physical servers P have a tendency to be similar to each other, as illustrated in FIG. 4.

Figure 6:
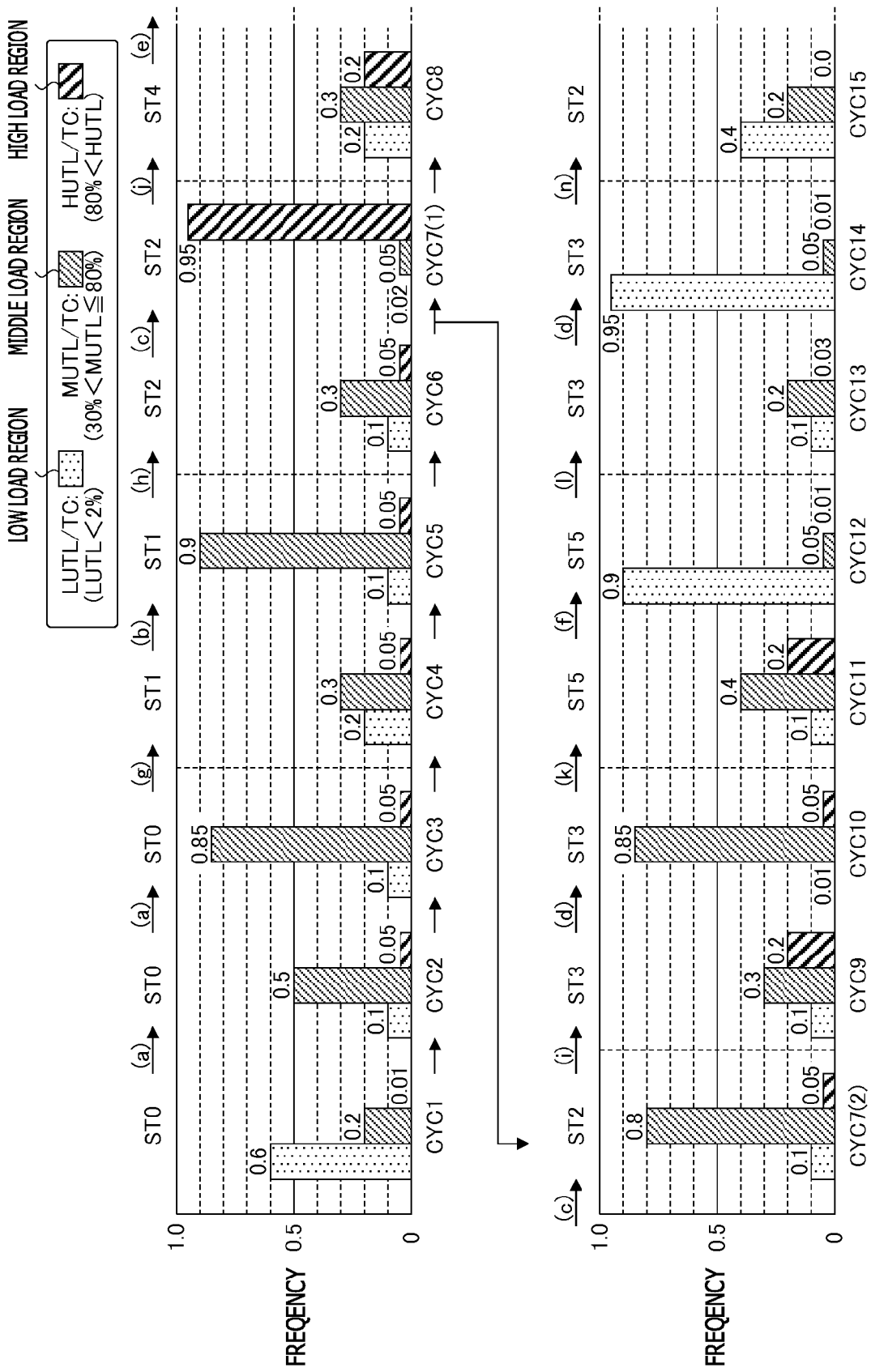
FIG. 6 illustrates an example of change of a load in an operation of the information processing system.

FIG. 6 illustrates an example of the change of the load in an operation of the information processing system SYS1 illustrated in FIG. 5. Marks of (a) to (l) and (n) in FIG. 6 are the same as the marks indicating holding or switching of the state of the information processing apparatus IPE1 illustrated in FIG. 5. FIG. 6 illustrates the frequency of the load of any one of the physical servers P in operation. Marks of CYC1 to CYC15 in FIG. 6 indicate a cycle of the control device CNTL collecting the load information. In FIG. 6, for easily understandable description, the frequency of performing switching between the states ST is higher than that in an actual operation of the information processing system SYS1.

First, in the state ST0, the load of the physical server P gradually becomes higher and the frequency at the middle load region exceeds "0.8" in a cycle CYC3. Thus, the control device CNTL causes a state of the information processing apparatus IPE1 to be switched from the state ST0 to the state ST1 ((g) in FIG. 6). Since switching of the state ST0 to the state ST1 causes the virtual server V0 to be replaced with the physical server P3, the processing capacity of the information processing apparatus IPE1 is improved and the frequency at the middle load region decreases in a cycle CYC4.

Then, in the state ST1, the load of the physical server P gradually becomes higher and the frequency at the middle load region exceeds "0.8" in a cycle CYC5. Thus, the control device CNTL causes a state of the information processing apparatus IPE1 to be switched from the state ST1 to the state ST2 ((h) in FIG. 6). Since switching of the state ST1 to the state ST2 causes the virtual server V1 to be replaced with the physical server P4, the processing capacity of the information processing apparatus IPE1 is improved and the frequency at the middle load region decreases in a cycle CYC6.

In the state ST2, the load of the physical server P becomes higher and the frequency at the high load region exceeds "0.9" in a cycle CYC7 (1). Thus, the control device CNTL causes a state of the information processing apparatus IPE1 to be switched from the state ST2 to the state ST4 ((j) in FIG. 6). Since switching of the state ST2 to the state ST4 causes the new physical server P5 to be operated, the processing capacity of the information processing apparatus IPE1 is improved and the frequency at the high load region decreases in a cycle CYC8.

In the state ST2, the load of the physical server P gradually becomes higher and the frequency at the middle load region exceeds "0.7" in the cycle CYC5. Thus, the control device CNTL causes a state of the information processing apparatus IPE1 to be switched from the state ST2 to the state ST3 ((i) in FIG. 6). Since switching of the state ST2 to the state ST3 causes the new virtual server V2 to be operated, the processing capacity of the information processing apparatus IPE1 is improved and the frequency at the middle load region decreases in a cycle CYC9.

In the state ST3, the load of the physical server P gradually becomes higher and the frequency at the middle load region exceeds "0.8" in a cycle CYC10. Thus, the control device CNTL causes a state of the information processing apparatus IPE1 to be switched from the state ST3 to the state ST5 ((k) in FIG. 6). Since switching of the state ST3 to the state ST5 causes the virtual server V2 to be replaced with the physical server P5, the processing capacity of the information processing apparatus IPE1 is improved and the frequency at the middle load region decreases in a cycle CYC11.

In the state ST5, the load of the physical server P becomes lower and the frequency at the low load region exceeds "0.8" in a cycle CYC12. Thus, the control device CNTL causes a state of the information processing apparatus IPE1 to be switched from the state ST5 to the state ST3 ((l) in FIG. 6). Since switching of the state ST5 to the state ST3 causes the physical server P5 to be replaced with the virtual server V2, the processing capacity of the information processing apparatus IPE1 decreases and the frequency at the middle load region increases in a cycle CYC13.

In the state ST3, the load of the physical server P becomes further lower and the frequency at the low load region exceeds "0.9" in a cycle CYC14. Thus, the control device CNTL causes a state of the information processing apparatus IPE1 to be switched from the state ST3 to the state ST2 ((n) in FIG. 6). Since switching of the state ST3 to the state ST2 causes the virtual server V2 to be terminated, the processing capacity of the information processing apparatus IPE1 decreases and the frequency at the middle load region increases in a cycle CYC15.

Figure 7:
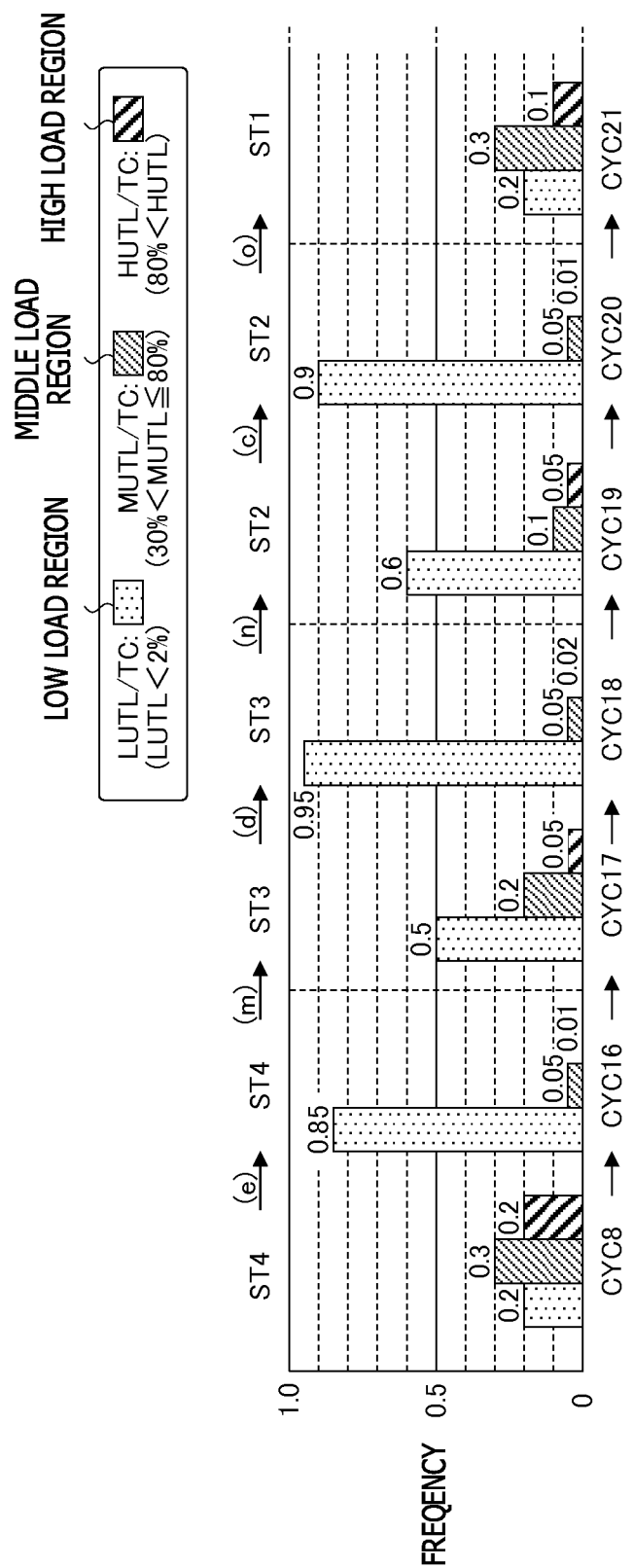
FIG. 7 illustrates another example of change of a load in an operation of the information processing system.

FIG. 7 illustrates another example of a change of the load in an operation of the information processing system SYS1 illustrated in FIG. 5. Detailed description of operations the same as or similar to those in FIG. 6 will be omitted. Marks of (c) to (e) and (m) to (o) in FIG. 7 are the same as the marks indicating holding or switching of the state of the information processing apparatus IPE1 illustrated in FIG. 5. For example, FIG. 7 illustrates operations subsequent to the cycle CYC8 in FIG. 6. The change of the state ST4 to the state ST3 and the change of the state ST2 to the state ST1 are similar to the change of the state ST5 to the state ST3.

Figure 8:
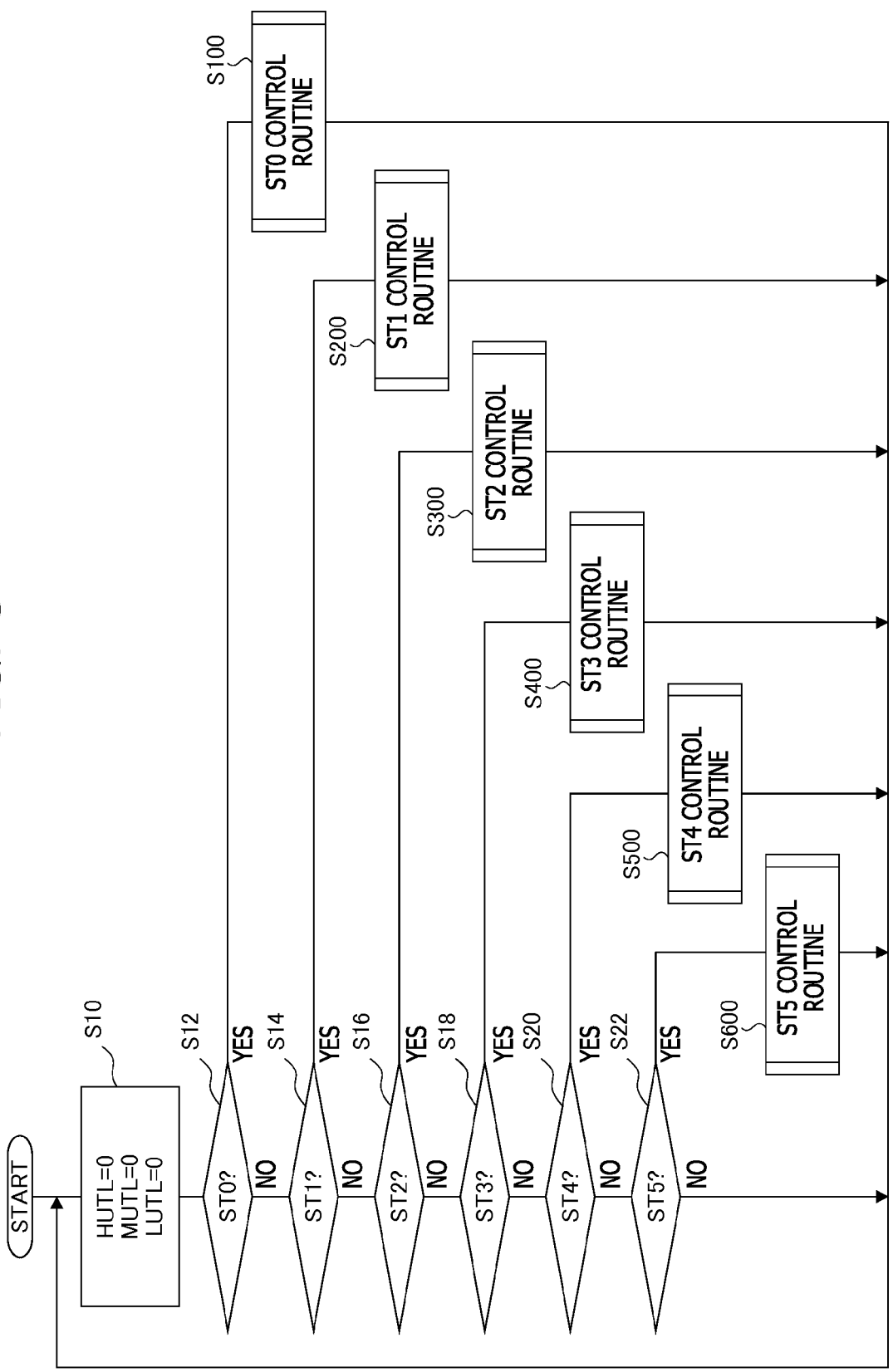
FIG. 8 illustrates an example of an operating flow in the control device.

FIG. 8 illustrates an example of an operating flow in the control device CNTL illustrated in FIG. 1. For example, the operating flow illustrated in FIG. 8 is implemented by the control device CNTL executing the control program of the information processing system SYS1. The control device CNTL is started when the information processing system SYS1 starts a function as a storage server or a data center.

Figure 9:
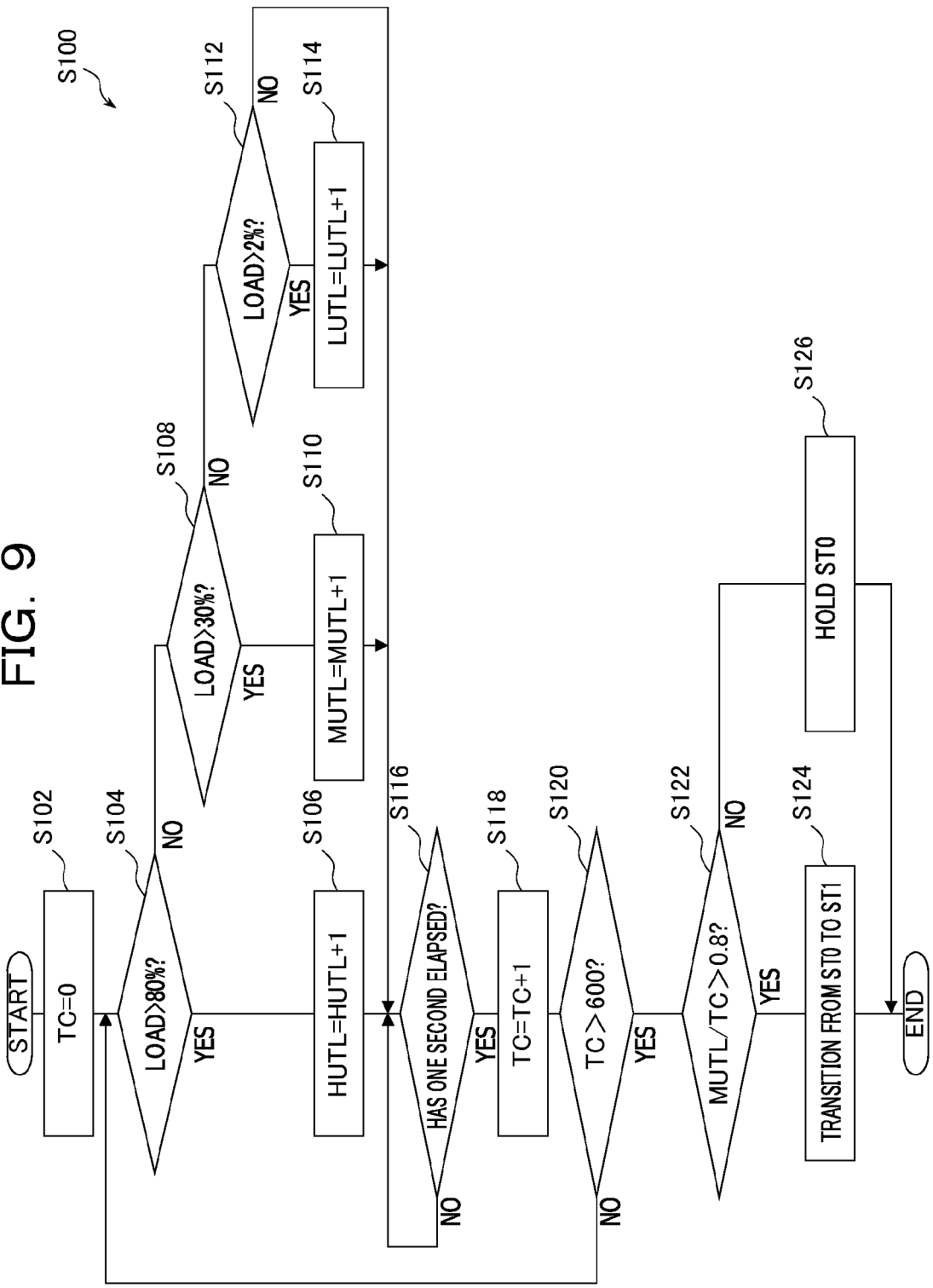
FIG. 9 illustrates an example of an ST0 control routine.

First, in Step S10, the control device CNTL initializes the variables HUTL, MUTL, and LUTL to be "0". In Step S12, the control device CNTL determines whether or not the information processing apparatus IPE1 is in the state ST0. When the information processing apparatus IPE1 is in the state ST0, the process proceeds to an ST0 control routine of Step S100. When the information processing apparatus IPE1 is not in the state ST0, the process proceeds to Step S14. In the ST0 control routine, it is determined whether a state of the information processing apparatus IPE1 is transitioned from the state ST0 to the state ST1 or is held to be in the state ST0. FIG. 9 illustrates an example of the ST0 control routine and FIG. 15 illustrates an example of a program of the ST0 control routine.

Figure 10:
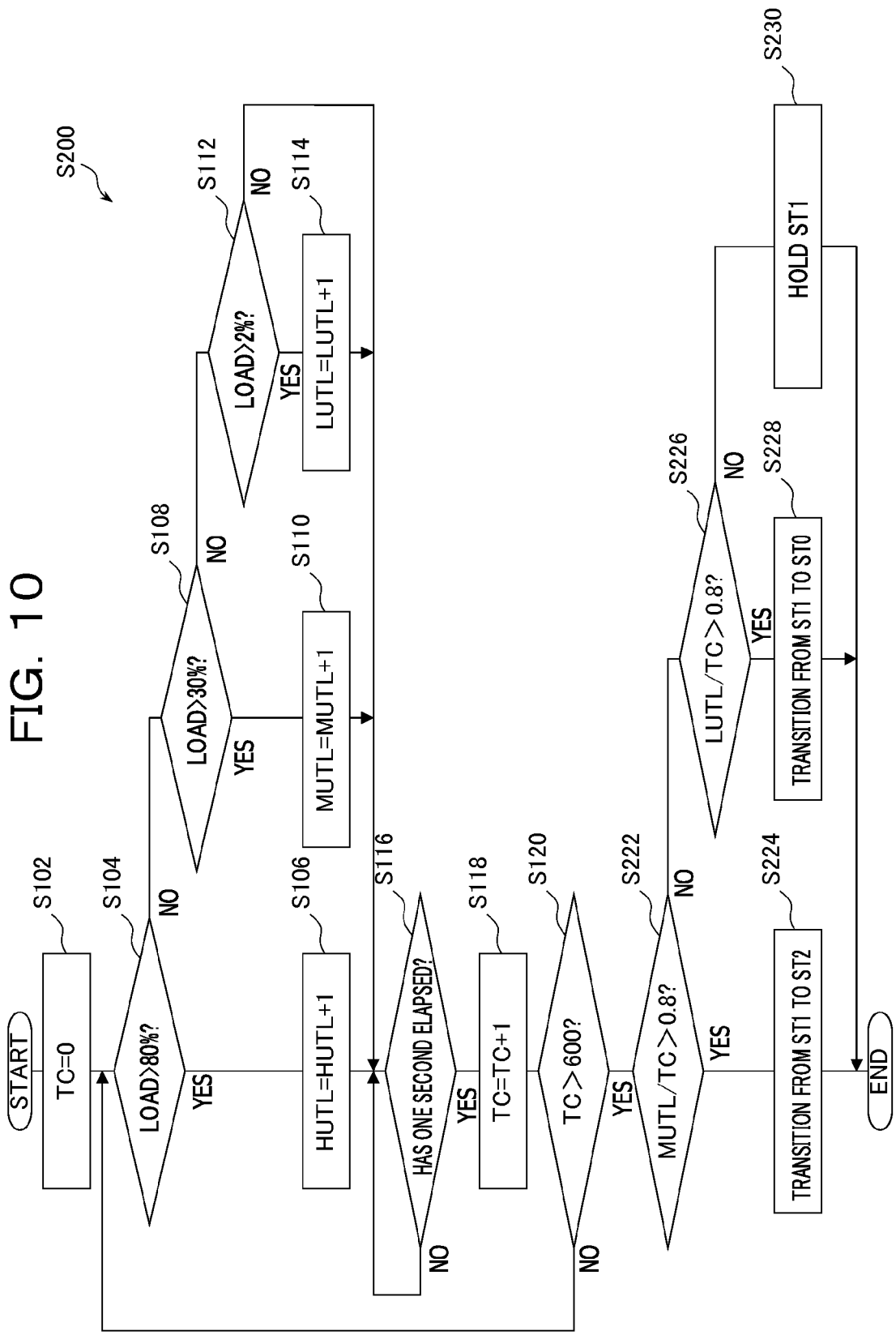
FIG. 10 illustrates an example of an ST1 control routine.

In Step S14, the control device CNTL determines whether or not the information processing apparatus IPE1 is in the state ST1. When the information processing apparatus IPE1 is in the state ST1, the process proceeds to an ST1 control routine of Step S200. When the information processing apparatus IPE1 is not in the state ST1, the process proceeds to Step S16. In the ST1 control routine, it is determined whether a state of the information processing apparatus IPE1 is transitioned from the state ST1 to the state ST2, is transitioned from the state ST1 to the state ST0, or is held to be in the state ST1. FIG. 10 illustrates an example of a flow of the ST1 control routine and FIG. 16 illustrates an example of a program of the ST1 control routine.

Figure 11:
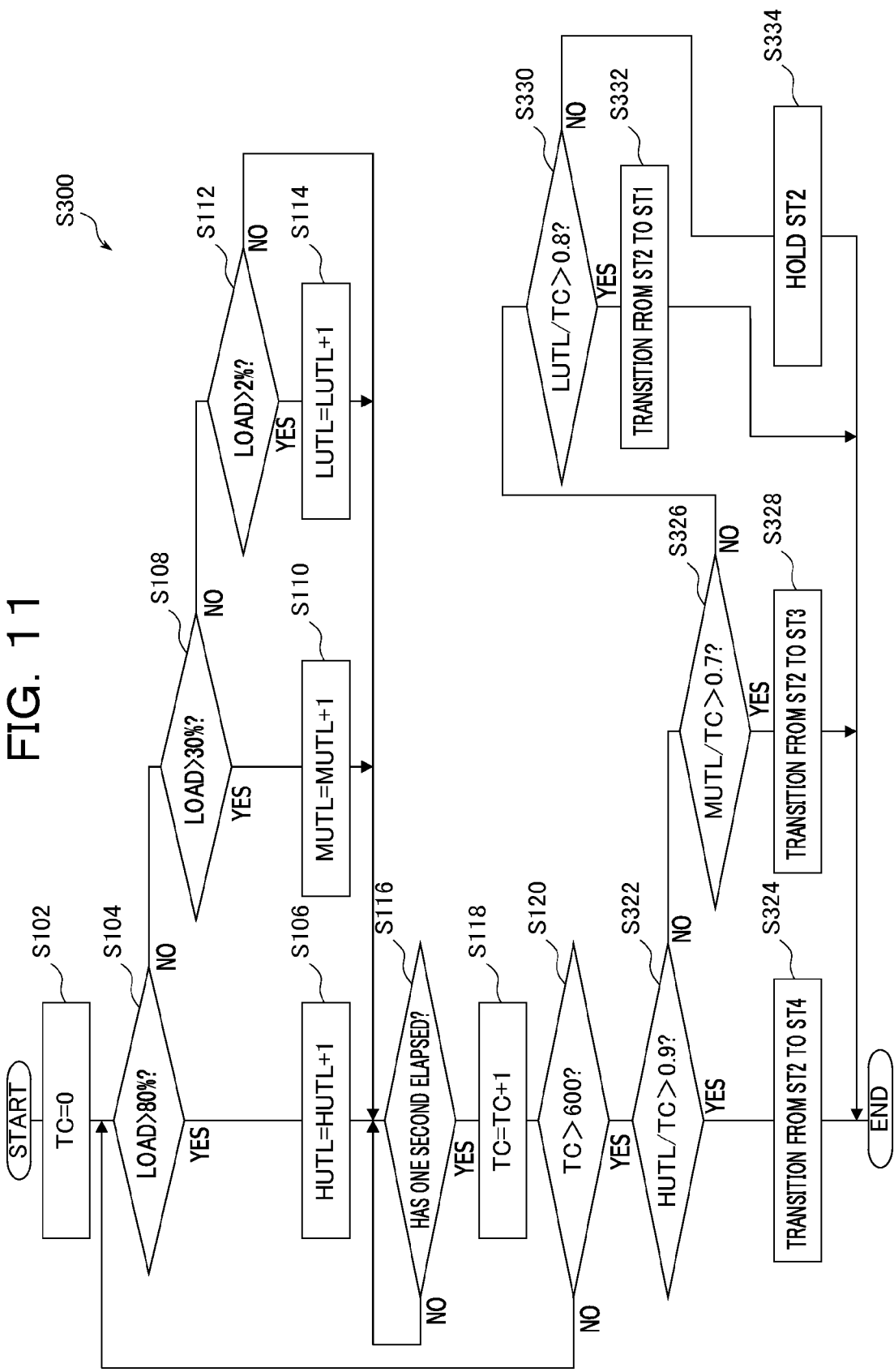
FIG. 11 illustrates an example of an ST2 control routine.

In Step S16, the control device CNTL determines whether or not the information processing apparatus IPE1 is in the state ST2. When the information processing apparatus IPE1 is in the state ST2, the process proceeds to an ST2 control routine of Step S300. When the information processing apparatus IPE1 is not in the state ST2, the process proceeds to Step S18. In the ST2 control routine, it is determined whether a state of the information processing apparatus IPE1 is transitioned from the state ST2 to the state ST4, is transitioned from the state ST2 to the state ST3, is transitioned from the state ST2 to the state ST1, or is held to be in the state ST2. FIG. 11 illustrates an example of a flow of the ST2 control routine and FIG. 17 illustrates an example of a program of the ST2 control routine.

Figure 12:
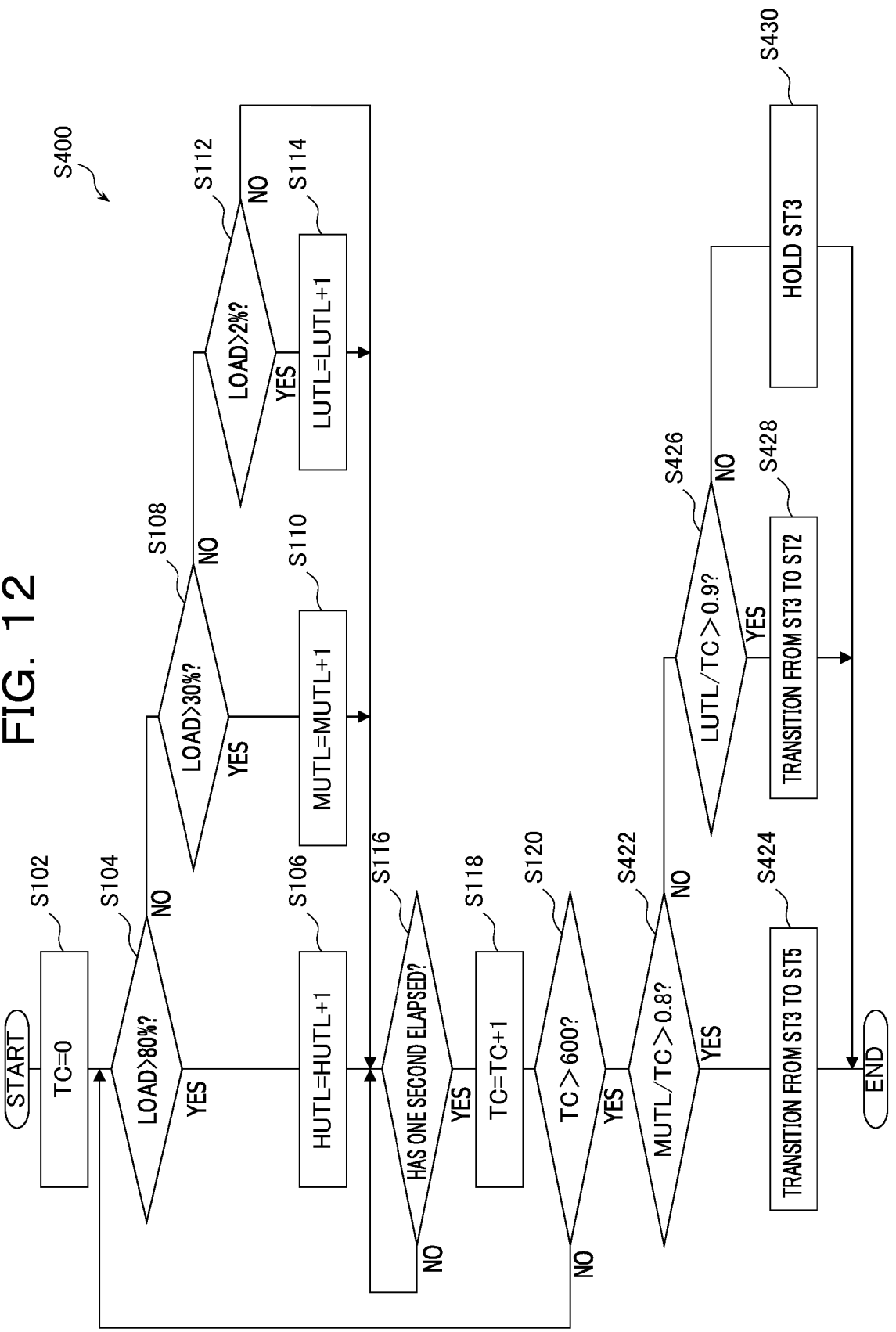
FIG. 12 illustrates an example of an ST3 control routine.

In Step S18, the control device CNTL determines whether or not the information processing apparatus IPE1 is in the state ST3. When the information processing apparatus IPE1 is in the state ST3, the process proceeds to an ST3 control routine of Step S400. When the information processing apparatus IPE1 is not in the state ST3, the process proceeds to Step S20. In the ST3 control routine, it is determined whether a state of the information processing apparatus IPE1 is transitioned from the state ST3 to the state ST5, is transitioned from the state ST3 to the state ST2, or is held to be in the state ST3. FIG. 12 illustrates an example of a flow of the ST3 control routine and FIG. 18 illustrates an example of a program of the ST3 control routine.

In Step S20, the control device CNTL determines whether or not the information processing apparatus IPE1 is in the state ST4. When the information processing apparatus IPE1 is in the state ST4, the process proceeds to an ST4 control routine of Step S500. When the information processing apparatus IPE1 is not in the state ST4, the process proceeds to Step S22. In the ST4 control routine, it is determined whether a state of the information processing apparatus IPE1 is transitioned from the state ST4 to the state ST3 or is held to be in the state ST4. FIG. 13 illustrates an example of a flow of the ST4 control routine and FIG. 19 illustrates an example of a program of the ST4 control routine.

In Step S22, the control device CNTL determines whether or not the information processing apparatus IPE1 is in the state ST5. When the information processing apparatus IPE1 is in the state ST5, the process proceeds to an ST5 control routine of Step S600. When the information processing apparatus IPE1 is not in the state ST5, the process returns to Step S10. In the ST5 control routine, it is determined whether a state of the information processing apparatus IPE1 is transitioned from the state ST5 to the state ST3 or is held to be in the state ST5. FIG. 14 illustrates an example of a flow of the ST5 control routine and FIG. 20 illustrates an example of a program of the ST5 control routine. The control device CNTL executes Steps S100, S200, S300, S400, S500, and S600 and then causes the process to return to Step S10.

FIG. 9 illustrates an example of the ST0 control routine illustrated in FIG. 8. First, in Step S102, the control device CNTL resets the time count TC to "0". In Step S104, the control device CNTL determines whether or not the load of any one of the physical servers P exceeds 80%. When the load exceeds 80%, the process proceeds to Step S106. When the load is equal to or less than 80%, the process proceeds to Step S108. In Step S106, the control device CNTL increases the variable HUTL by "one" and causes the process to proceed to Step S116.

In Step S108, the control device CNTL determines whether or not the load of any one of the physical servers P exceeds 30%. When the load exceeds 30%, that is, when the load exceeds 30% and is equal to or less than 80%, the process proceeds to Step S110. When the load is equal to or less than 30%, the process proceeds to Step S112. In Step S110, the control device CNTL increases the variable MUTL by "one" and causes the process to proceed to Step S116.

In Step S112, the control device CNTL determines whether or not the load of any one of the physical servers P is less than 2%. When the load is less than 2%, the process proceeds to Step S114. When the load is equal to or more than 2%, that is, when the load is 2% or more and 30% or less, the process proceeds to Step S116. In Step S114, the control device CNTL increases the variable LUTL by "one" and causes the process to proceed to Step S116.

In Step S116, the control device CNTL waits for, for example, one second and then causes the process to proceed to Step S118. In Step S118, the control device CNTL increases the time count TC by "one". In Step S120, the control device CNTL determines whether or not the time count TC exceeds "600". When the time count TC exceeds "600", that is, when an aggregate time of the variables HUTL, MUTL, and LUTL exceeds 600 seconds, the process proceeds to Step S122. When the time count TC is equal to or less than "600", the process returns to Step S104.

In Step S122, the control device CNTL determines whether or not the frequency of the load at the middle load region, which is a value obtained by dividing the value of the variable MUTL by the time count TC exceeds "0.8". When the frequency of the load at the middle load region exceeds "0.8", the process proceeds to Step S124. When the frequency of the load at the middle load region is equal to or less than "0.8", the process proceeds to Step S126.

In Step S124, the control device CNTL causes a state of the information processing apparatus IPE1 to be transitioned from the state ST0 to the state ST1. In Step S126, the control device CNTL causes the information processing apparatus IPE1 to be held in the state ST0. After the processes of Steps S124 and S126, the ST0 control routine is ended. The ST0 control routine is executed for each physical server P in operation. When any one of the physical servers P satisfies a determination condition in Step S122 (Yes in S122), Step S124 is processed.

FIG. 10 illustrates an example of the ST1 control routine illustrated in FIG. 8. Detailed description of processes the same as or similar to those in FIG. 9 will be omitted. Processes from Step S102 to Step S120 are the same as those in FIG. 9.

In Step S222, the control device CNTL performs the same determination as that in Step S122 illustrated in FIG. 9. When the frequency of the load at the middle load region exceeds "0.8", the control device CNTL causes a state of the information processing apparatus IPE1 to be transitioned from the state ST1 to the state ST2 in Step S224. When the frequency of the load at the middle load region is equal to or less than "0.8", the process proceeds to Step S226.

In Step S226, the control device CNTL determines whether or not the frequency of the load at the low load region, which is a value obtained by dividing the value of the variable LUTL by the time count TC exceeds "0.8". When the frequency of the load at the low load region exceeds "0.8", the process proceeds to Step S228. When the frequency of the load at the low load region is equal to or less than "0.8", the process proceeds to Step S230. In Step S228, the control device CNTL causes a state of the information processing apparatus IPE1 to be transitioned from the state ST1 to the state ST0. In Step S230, the control device CNTL causes the information processing apparatus IPE1 to be held in the state ST1. After processes of Steps S224, S228, and S230, the ST1 control routine is ended.

The ST1 control routine is executed for each physical server P in operation. When any one of the physical servers P satisfies a determination condition in Step S222 (Yes in S222), Step S224 is processed. When any one of the physical servers P satisfies a determination condition in Step S226 (Yes in S226), Step S228 is processed. The summation of frequency MUTL/TC and frequency LUTL/TC does not exceed 1.0. Thus, the determination conditions of Steps S222 and S226 are not simultaneously satisfied. As illustrated in FIG. 4, the load of the plurality of physical servers P which are operating is changed with a similar tendency. For this reason, it does not occur that one of the plurality of physical servers P satisfies the determination condition of Step S222 and another of the plurality of physical servers P satisfies the determination condition of Step S226.

FIG. 11 illustrates an example of the ST2 control routine illustrated in FIG. 8. Detailed description of processes the same as or similar to those in FIGS. 9 and 10 will be omitted. The processes from Step S102 to Step S120 are the same as those in FIG. 9.

In Step S322, the control device CNTL determines whether or not the frequency of the load at the high load region, which is a value obtained by dividing the value of the variable HUTL by the time count TC exceeds "0.9". When the frequency of the load at the high load region exceeds "0.9", the process proceeds to Step S324. When the frequency of the load at the high load region is equal to or less than "0.9", the process proceeds to Step S326. In Step S324, the control device CNTL causes a state of the information processing apparatus IPE1 to be transitioned from the state ST2 to the state ST4.

In Step S326, the control device CNTL determines whether or not the frequency of the load at the middle load region, which is a value obtained by dividing the value of the variable MUTL by the time count TC exceeds "0.7". When the frequency of the load at the middle load region exceeds "0.7", the process proceeds to Step S328. When the frequency of the load at the middle load region is equal to or less than "0.7", the process proceeds to Step S330. In Step S328, the control device CNTL causes a state of the information processing apparatus IPE1 to be transitioned from the state ST2 to the state ST3.

In Step S330, the control device CNTL performs determination similar to that in Step S226 illustrated in FIG. 10. When the frequency of the load at the low load region exceeds "0.8", the control device CNTL causes a state of the information processing apparatus IPE1 to be transitioned from the state ST2 to the state ST1 in Step S332. When the frequency of the load at the low load region is equal to or less than "0.8", the process proceeds to Step S334. In Step S334, the control device CNTL causes the information processing apparatus IPE1 to be held in the state ST2. After the processes of Steps S324, S328, S332, and S334, the ST2 control routine is ended.

The ST2 control routine is executed for each physical server P in operation. When any one of the physical servers P satisfies a determination condition in Step S322 (Yes in S322), Step S324 is processed. When any one of the physical servers P satisfies a determination condition in Step S326 (Yes in S326), Step S328 is processed. When any one of the physical servers P satisfies a determination condition in Step S330 (Yes in S330), Step S334 is processed. Similarly to FIG. 10, the summation of frequency HUTL/TC, frequency MUTL/TC, and frequency LUTL/TC does not exceed 1.0. Thus, the determination conditions of Steps S322, S326, and S330 are not simultaneously satisfied. Similarly to FIG. 10, it does not occur that the plurality of physical servers P which are operating satisfy the determination conditions (S322, S326, and S330) different from each other.

FIG. 12 illustrates an example of the ST3 control routine illustrated in FIG. 8. Detailed description of processes the same as or similar to those in FIGS. 9 and 10 will be omitted. The processes from Step S102 to Step S120 are the same as those in FIG. 9.

In Step S422, the control device CNTL performs the same determination as that in Step S122 illustrated in FIG. 9. When the frequency of the load at the middle load region exceeds "0.8", the control device CNTL causes a state of the information processing apparatus IPE1 to be transitioned from the state ST3 to the state ST5 in Step S424. When the frequency of the load at the middle load region is equal to or less than "0.8", the process proceeds to Step S426.

In Step S426, the control device CNTL performs the same determination as that in Step S226 illustrated in FIG. 10. When the frequency of the load at the low load region exceeds "0.9", the control device CNTL causes a state of the information processing apparatus IPE1 to be transitioned from the state ST3 to the state ST2 in Step S428. When the frequency of the load at the low load region is equal to or less than "0.9", the process proceeds to Step S430. In Step S430, the control device CNTL causes the information processing apparatus IPE1 to be held in the state ST3. After processes of Steps S424, S428, and S430, the ST3 control routine is ended.

The ST3 control routine is executed for each physical server P in operation. When any one of the physical servers P satisfies a determination condition in Step S422 (Yes in S422), Step S424 is processed. When any one of the physical servers P satisfies a determination condition in Step S426 (Yes in S426), Step S428 is processed. The summation of frequency MUTL/TC and frequency LUTL/TC does not exceed 1.0. Thus, the determination conditions of Steps S422 and S426 are not simultaneously satisfied. Similarly to FIG. 10, it does not occur that the plurality of physical servers P which are operating satisfy the determination conditions (S422 and S426) different from each other.

FIG. 13 illustrates an example of the ST4 control routine illustrated in FIG. 8. Detailed description of processes the same as or similar to those in FIGS. 9 and 10 will be omitted. The processes from Step S102 to Step S120 are the same as those in FIG. 9.

In Step S522, the control device CNTL performs the same determination as that in Step S226 illustrated in FIG. 10. When the frequency of the load at the low load region exceeds "0.8", the control device CNTL causes a state of the information processing apparatus IPE1 to be transitioned from the state ST4 to the state ST3 in Step S524. When the frequency of the load at the low load region is equal to or less than "0.8", the process proceeds to Step S526. In Step S526, the control device CNTL causes the information processing apparatus IPE1 to be held in the state ST4. After processes of Steps S524 and S526, the ST4 control routine is ended. The ST4 control routine is executed for each physical server P in operation. When any one of the physical servers P satisfies a determination condition in Step S522 (Yes in S522), Step S524 is processed.

FIG. 14 illustrates an example of the ST5 control routine illustrated in FIG. 8. Detailed description of processes the same as or similar to those in FIGS. 9 and 10 will be omitted. The processes from Step S102 to Step S120 are the same as those in FIG. 9.

In Step S622, the control device CNTL performs the same determination as that in Step S226 illustrated in FIG. 10. When the frequency of the load at the low load region exceeds "0.8", the control device CNTL causes a state of the information processing apparatus IPE1 to be transitioned from the state ST5 to the state ST3 in Step S624. When the frequency of the load at the low load region is equal to or less than "0.8", the process proceeds to Step S626. In Step S626, the control device CNTL causes the information processing apparatus IPE1 to be held in the state ST5. After processes of Steps S624 and S626, the ST5 control routine is ended. The ST5 control routine is executed for each physical server P in operation. When any one of the physical servers P satisfies a determination condition in Step S622 (Yes in S622), Step S624 is processed.

FIG. 15 illustrates an example of a program of executing the ST0 control routine illustrated in FIG. 9. For example, FIG. 15 illustrates a source list of a program executed by the CPU of the control device CNTL and a row number is added to the forefront in each row, for convenient description, in FIG. 15. Characters subsequent to a mark of "//" indicate a comment.

Variables are defined by using "DEFINDE" from a first row to a ninth row. A variable HTH indicates the threshold value VT1 (80%) illustrated in FIG. 3. A variable MTH indicates the threshold value VT2 (30%) illustrated in FIG. 3. A variable LTH indicates the threshold value VT3 (2%) illustrated in FIG. 3. A variable TIME indicates the time count TC illustrated in FIG. 3 and a collecting period (for example, 600 seconds) for collecting the load information of the physical server P.

A variable RPEXP indicates the frequency of the load (0.9; threshold value) at the high load region, for determining addition of the physical server P. A variable RVEXP indicates the frequency of the load (0.8; threshold value) at the middle load region, for determining replacement of the virtual server V with the physical server P. A variable RVNEW indicates the frequency of the load (0.7; threshold value) at the middle load region, for determining addition of the virtual server V. A variable RSH indicates the frequency of the load (0.8; threshold value) at the low load region, for determining a termination of the virtual server V. A variable RVRM indicates the frequency of the load (0.9; threshold value) at the low load region, for determining replacement of the physical server P with the virtual server V.

When the state (State) of the information processing apparatus IPE1 is ST0 (=0) in an 11th row, rows from a 12th row to a 23rd row are executed. A variable measureCpuUtil in a 13th row, a 15th row, and a 17th row indicates the load of the physical server P for each time count TC, which is held in the holding section HLD. "do transState" in a 21st row and a 23rd row refers to a command for changing the state of the information processing apparatus IPE1. The comments added to the respective rows indicate corresponding of processes executed in the rows from the 12th row to the 23rd row to Steps illustrated in FIG. 9.

FIG. 16 illustrates an example of a program of executing the ST1 control routine illustrated in FIG. 10. Detailed description regarding statements the same as or similar to those in FIG. 15 will be omitted. Definitions of variables by "DEFINDE" in rows from a first row to a ninth row are the same as those in FIG. 15. When the state (State) of the information processing apparatus IPE1 is ST1 (=1) in an 11th row, rows from a 12th row to a 25th row are executed. Comments added to the respective rows indicate corresponding of processes executed in the rows from the 12th row to the 25th row to Steps illustrated in FIG. 10.

FIG. 17 illustrates an example of a program of executing the ST2 control routine illustrated in FIG. 11. Detailed description regarding statements the same as or similar to those in FIG. 15 will be omitted. Definitions of variables by "DEFINDE" in rows from a first row to a ninth row are the same as those in FIG. 15. When the state (State) of the information processing apparatus IPE1 is ST2 (=2) in an 11th row, rows from a 12th row to a 27th row are executed. Comments added to the respective rows indicate corresponding of processes executed in the rows from the 12th row to the 27th row to Steps illustrated in FIG. 11.

FIG. 18 illustrates an example of a program of executing the ST3 control routine illustrated in FIG. 12. Detailed description regarding statements the same as or similar to those in FIG. 15 will be omitted. Definitions of variables by "DEFINDE" in rows from a first row to a ninth row are the same as those in FIG. 15. When the state (State) of the information processing apparatus IPE1 is ST3 (=3) in an 11th row, rows from a 12th row to a 25th row are executed. Comments added to the respective rows indicate corresponding of processes executed in the rows from the 12th row to the 25th row to Steps illustrated in FIG. 12.

FIG. 19 illustrates an example of a program of executing the ST4 control routine illustrated in FIG. 13. Detailed description regarding statements the same as or similar to those in FIG. 15 will be omitted. Definitions of variables by "DEFINDE" in rows from a first row to a ninth row are the same as those in FIG. 15. When the state (State) of the information processing apparatus IPE1 is ST4 (=4) in an 11th row, rows from a 12th row to a 23rd row are executed. Comments added to the respective rows indicate corresponding of processes executed in the rows from the 12th row to the 23rd row to Steps illustrated in FIG. 13.

FIG. 20 illustrates an example of a program of executing the ST5 control routine illustrated in FIG. 14. Detailed description regarding statements the same as or similar to those in FIG. 15 will be omitted. Definitions of variables by "DEFINDE" in rows from a first row to a ninth row are the same as those in FIG. 15. When the state (State) of the information processing apparatus IPE1 is ST5 (=5) in an 11th row, rows from a 12th row to a 23rd row are executed. Comments added to the respective rows indicate corresponding of processes executed in the rows from the 12th row to the 23rd row to Steps illustrated in FIG. 14.

In the above description, in the embodiment illustrated in FIGS. 1 to 20, it is possible to change the processing performance of the information processing system SYS1 depending on a change of the load of the physical server P without an influence of the information processing system SYS1 on efficiency in information processing. For example, the control device CNTL detects that the load of the physical server P tends to increase and replaces the virtual server V with the physical server P and thus it is possible to increase the processing capacity of the information processing apparatus IPE1. At this time, switching the coupling of the storage device D from the virtual server V to the physical server P causes data not to be transitioned between the storage devices D. Accordingly, it is possible to improve the processing performance of the information processing system SYS1 without an influence on a service provided by the information processing system SYS1.

Addition of the virtual server V resulting in transition of data is performed during a time period when a tendency of increasing the load of the physical server P is lower than a tendency of increasing the load when the virtual server V is replaced with the physical server P. Thus, it is possible to reduce an influence of data transition processing which occurs due to addition of the virtual server V, on a service of the storage server and the like, compared to when the load becomes large and thus data is transitioned.

When the load of the physical server P becomes small, it is possible to stop one of the physical servers P by replacing the physical server P with the virtual server V. Accordingly, it is possible to decrease the processing capacity of the information processing apparatus IPE1 and to largely reduce the power consumed by the information processing apparatus IPE1, compared to when one of the physical servers P continues to be in operation. At this time, switching the coupling of the storage device D from the physical server P to the virtual server V causes data not to be transitioned between the storage devices D. Accordingly, it is possible to degrade the processing performance of the information processing system SYS1 without an influence on a service provided by the information processing system SYS1.

Removal of the virtual server V resulting in transition of data is performed when the load of the physical server P is smaller than a load when the physical server P is replaced with the virtual server V. Accordingly, it is also possible to reduce an influence on a service provided by the information processing system SYS1 to the minimum when removing the virtual server V causes data to be transitioned between the storage devices D.

FIG. 21 illustrates an example in which a control device changes the state of an information processing apparatus IPE1 in another embodiment of the information processing system, the control method of the information processing system, and the control program of the information processing system. A control device CNTL which executes processes illustrated in FIG. 21 and an information processing apparatus IPE1 which is controlled by the control device CNTL are similar to those in FIG. 1 except that a program executed by the control device CNTL is different. FIG. 21 illustrates a control method executed by the control device CNTL mounted in the information processing system SYS1 illustrated in FIG. 1 and processes by the control program executed by the control device CNTL. Detailed descriptions of components the same as or similar to those in the embodiment illustrated in FIGS. 1 to 20 will be omitted.

"NOW" illustrated in FIG. 21 indicates the current state of the information processing apparatus IPE1. Processes A to E illustrated around the state "NOW" in FIG. 21 represent operations of the information processing apparatus IPE1 executed by control of the control device CNTL. Dot-lined arrows indicate that the state of the information processing apparatus IPE1 which executes processes by control of the control device CNTL becomes the state "NOW" anew. In FIG. 21, upward arrows which are positioned behind numerical values of the load and the frequency indicate that the load and the frequency are larger than the numerical values. Each downward arrow which is positioned behind a numerical value of the load indicates that the load is smaller than each of the numerical values. In FIG. 21, "load" and "frequency" are the same as "load" and "frequency" which are described with reference to FIGS. 1 to 20.

For example, when the frequency of that the load of any one of the physical servers P in operation exceeds 30% and is equal to or less than 80% exceeds "0.8" ((Condition A) described with reference to FIG. 3), the control device CNTL executes Process A of changing the state of the information processing apparatus IPE1. The control device CNTL replaces one of the virtual servers V with one of the physical servers P by terminating any one of the virtual servers V and operating any one of the physical servers P, in Process A. The storage device D which has been coupled with the virtual server V to be terminated is coupled with the physical server P to be operated.

For example, the change of the state of the information processing apparatus IPE1 through Process A is the same as the change of the state ST0 to the state ST1, the change of the state ST1 to the state ST2, and the change of the state ST3 to the state ST5 which are illustrated in FIG. 5. When the load exceeds 80%, Process C may be executed prior to Process A in accordance with "frequency".

When the frequency of the load of any one of the physical servers P in operation exceeds 30% and is equal to or less than 80% exceeds "0.7" ((Condition B) described with reference to FIG. 3), the control device CNTL executes Process B of changing the state of the information processing apparatus IPE1. The control device CNTL adds one of the virtual servers V to the information processing apparatus IPE1 by causing any one of the terminated virtual servers V to be operated on any one of the physical servers P in operation, in Process B. For example, the change of the state of the information processing apparatus IPE1 through Process B is the same as the change of the state ST2 to the state ST3 illustrated in FIG. 5. When the frequency exceeds "0.8", Process A is executed prior to Process B. When the load exceeds 80%, Process C may be executed prior to Process B in accordance with "frequency".

When the frequency of the load of any one of the physical servers P in operation exceeding 80% exceeds "0.9" ((Condition C) described with reference to FIG. 3), the control device CNTL executes Process C of changing the state of the information processing apparatus IPE1. The control device CNTL adds one of the physical servers P to the information processing apparatus IPE1 by causing any one of the currently stopped physical servers P to be operated, in Process C. For example, change of the state of the information processing apparatus IPE1 through Process C is the same as change of the state ST2 to the state ST4 illustrated in FIG. 5.

When the frequency of the load of any one of the physical servers P in operation at less than 2% exceeds "0.8" ((Condition D) described with reference to FIG. 3), the control device CNTL executes Process D of changing the state of the information processing apparatus IPE1. The control device CNTL replaces one of the physical servers P with one of the virtual servers V by causing any one of the physical servers P to be stopped and causing any one of the virtual servers V to be operated, in Process D. The storage device D which has been coupled with the physical server P to be stopped is coupled with the virtual server V to be operated anew.

For example, the change of the state of the information processing apparatus IPE1 through Process D is the same as the change of the state ST1 to the state ST0, the change of the state ST2 to the state ST1, the change of the state ST4 to the state ST3, and the change of the state ST5 to the state ST3 which are illustrated in FIG. 5. When the frequency exceeds "0.9", Process E is executed prior to Process D.

When the frequency of the load of any one of the physical servers P in operation at less than 2% exceeds "0.9" ((Condition E) described with reference to FIG. 3), the control device CNTL executes Process E of changing the state of the information processing apparatus IPE1. The control device CNTL removes one of the virtual servers V from the information processing apparatus IPE1 by terminating any one of the operating virtual servers V, in Process E. For example, the change of the state of the information processing apparatus IPE1 through Process E is the same as the change of the state ST3 to the state ST2 illustrated in FIG. 5.

When the load of any one of the physical servers P in operation satisfies no condition for executing Process A, Process B, Process C, Process D, and Process E, the control device CNTL holds the state of the information processing apparatus IPE1 without changing ("F" in FIG. 21).

Figure 22:
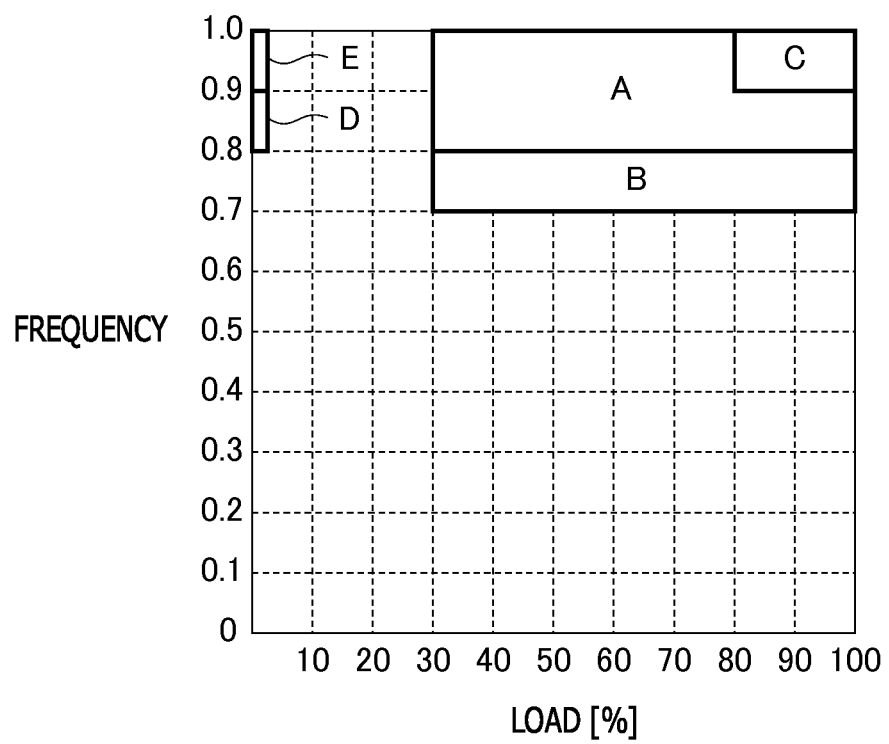
FIG. 22 illustrates an example of a relationship between each process, a load, and frequency in another embodiment.

FIG. 22 illustrates an example of a relationship between each of Process A, Process B, Process C, Process D, and Process E, the load, and the frequency illustrated in FIG. 21. As described with reference to FIG. 21, Process C has the primary priority and Process A has the secondary priority in a condition obtained by overlapping the conditions for executing Process A, Process B, and Process C with each other. Process E has a priority in a condition obtained by overlapping the conditions for executing Process D and Process E with each other.

In the above description, in the embodiment illustrated in FIGS. 21 and 22, it is also possible to obtain an effect similar to the effect obtained in the embodiment illustrated in FIGS. 1 to 20. That is, it is possible to improve the processing performance of the information processing system SYS1 depending on the change of the load of the physical server P without an influence of the information processing system SYS1 on efficiency in information processing. Additionally, it is possible to degrade the processing performance of the information processing system SYS1 depending on the change of the load of the physical server P without an influence of the information processing system SYS1 on efficiency in information processing.

Features and advantages according to the embodiments will be apparent from the above-described detailed description. This intends to have the features and the advantages according to the embodiments without departing from the spirit and scope of the claims. A person with ordinary skill in the art will easily consider various enhancements and changes. Accordingly, appropriate improvements and substitutions which could be included in the scope disclosed in the embodiments may be made without the intention to limit the range of the embodiments having the inventive characteristics according to the above description.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of processors configured to cause a virtual machine on each processor to be operated or terminated;
a plurality of storage devices; and
a control device configured to:
collect processing loads of the respective processors,
cause a first virtual machine which operates on a first processor in which a frequency of a processing load exceeding a first threshold exceeds a first proportion, to be terminated,
cause a second processor which is stopped among the plurality of processors, to be operated,
cause a first storage device which is coupled with the terminated first virtual machine among the plurality of storage devices, to be coupled with the operated second processor,
when a frequency of a processing load of a fifth processor among the plurality of processors exceeding a second threshold higher than the first threshold exceeds a third proportion higher than the first proportion, cause a sixth processor which is stopped among the plurality of processors, to be operated, and
cause the sixth processor to be coupled with a third storage device which is not coupled with the plurality of processors and the virtual machines among the plurality of storage devices.

2. The information processing system according to claim 1, wherein the control device is configured to:

when a frequency of a processing load of a third processor among the plurality of processors exceeding the first threshold exceeds a second proportion smaller than the first proportion, cause a terminated second virtual machine to be operated on a fourth processor which is operating among the plurality of processors, and cause the operated second virtual machine to be coupled with a second storage device among the plurality of storage devices, which is not coupled with the plurality of processors and the virtual machines.

3. The information processing system according to claim 1, wherein the control device is configured to:

when a frequency of a processing load of a seventh processor among the plurality of processors being less than a third threshold lower than the first threshold exceeds a fourth proportion, cause an eighth processor which does not operate the virtual machine among the plurality of processors, to be stopped, cause a third virtual machine to be operated on a ninth processor which is operating among the plurality of processors, and cause the first storage device to be coupled with the operated third virtual machine.

4. The information processing system according to claim 3, wherein the control device is configured to:

when a frequency of a processing load of a tenth processor among the plurality of processors being less than the third threshold exceeds a fifth proportion higher than the fourth proportion, cause data which is held in a fourth storage device coupled with a fourth virtual machine which is operating on an eleventh processor among the plurality of processors to be transmitted to a fifth storage device which is coupled with an operating fifth virtual machine among the plurality of virtual machine or coupled with an operating twelfth processor among the plurality of processors, cause the fourth virtual machine to be terminated, and separate the fourth storage device from the fourth virtual machine.

5. The information processing system according to claim 1, further comprising:

a switch configured to couple any one of the plurality of processors and the virtual machines on the plurality of processors with any one of the plurality of storage devices.

6. A method of controlling an information processing system including a plurality of processors and a plurality of storage devices, the plurality of processors causing a virtual machine on each processor to be operated or terminated, the method comprising:

collecting processing loads of the respective processors;

terminating a first virtual machine which operates on a first processor in which a frequency of a processing load exceeding a first threshold exceeds a first proportion;

operating a second processor which is stopped among the plurality of processors;

coupling, by a processor, a first storage device which is coupled with the terminated first virtual machine among the plurality of storage devices, with the operated second processor;

when a frequency of a processing load of a fifth processor among the plurality of processors exceeding a second threshold higher than the first threshold exceeds a third proportion higher than the first proportion, operating a sixth processor which is stopped among the plurality of processors; and coupling the sixth processor with a third storage device which is not coupled with the plurality of processors and the virtual machines among the plurality of storage devices.

7. The method according to claim 6, further comprising:

when a frequency of a processing load of a third processor among the plurality of processors exceeding the first threshold exceeds a second proportion smaller than the first proportion, operating a terminated second virtual machine on a fourth processor which is operating among the plurality of processors; and coupling the operated second virtual machine with a second storage device among the plurality of storage devices, which is not coupled with the plurality of processors and the virtual machines.

8. The method according to claim 6, further comprising:

when a frequency of a processing load of a seventh processor among the plurality of processors being less than a third threshold lower than the first threshold exceeds a fourth proportion, stopping an eighth processor which does not operate the virtual machine among the plurality of processors;

operating a third virtual machine on a ninth processor which is operating among the plurality of processors; and coupling the first storage device with the operated third virtual machine.

9. The method according to claim 8, further comprising:

when a frequency of a processing load of a tenth processor among the plurality of processors being less than the third threshold exceeds a fifth proportion higher than the fourth proportion, transmitting data which is held in a fourth storage device coupled with a fourth virtual machine which is operating on an eleventh processor among the plurality of processors to a fifth storage device which is coupled with an operating fifth virtual machine among the plurality of virtual machine or coupled with an operating twelfth processor among the plurality of processors;

terminating the fourth virtual machine; and separating the fourth storage device from the fourth virtual machine.

10. A non-transitory computer-readable storage medium storing a program that causes a computer to execute a process, the process comprising:

collecting processing loads of a plurality of processors configuring to cause a virtual machine on each processor to be operated or terminated;

causing a first virtual machine which operates on a first processor in which a frequency of a processing load exceeding a first threshold exceeds a first proportion, to be terminated;

causing a second processor which is stopped among the plurality of processors, to be operated;

causing a first storage device which is coupled with the terminated first virtual machine among a plurality of storage devices, to be coupled with the operated second processor;

when a frequency of a processing load of a fifth processor among the plurality of processors exceeding a second threshold higher than the first threshold exceeds a third proportion higher than the first proportion, causing a sixth processor which is stopped among the plurality of processors, to be operated; and causing the sixth processor to be coupled with a third storage device which is not coupled with the plurality of processors and the virtual machines among the plurality of storage devices.

11. The non-transitory computer-readable storage medium according to claim 10, wherein the process further comprising:

when a frequency of a processing load of a third processor among the plurality of processors exceeding the first threshold exceeds a second proportion smaller than the first proportion, causing a terminated second virtual machine to be operated on a fourth processor which is operating among the plurality of processors; and causing the operated second virtual machine to be coupled with a second storage device among the plurality of storage devices, which is not coupled with the plurality of processors and the virtual machines.

12. The non-transitory computer-readable storage medium according to claim 10, wherein the process further comprising:

when a frequency of a processing load of a seventh processor among the plurality of processors being less than a third threshold lower than the first threshold exceeds a fourth proportion, causing an eighth processor which does not operate the virtual machine among the plurality of processors, to be stopped;

causing a third virtual machine to be operated on a ninth processor which is operating among the plurality of processors; and causing the first storage device to be coupled with the operated third virtual machine.

13. The non-transitory computer-readable storage medium according to claim 12, wherein the process further comprising:

when a frequency of a processing load of a tenth processor among the plurality of processors being less than the third threshold exceeds a fifth proportion higher than the fourth proportion, causing data which is held in a fourth storage device coupled with a fourth virtual machine which is operating on an eleventh processor among the plurality of processors to be transmitted to a fifth storage device which is coupled with an operating fifth virtual machine among the plurality of virtual machine or coupled with an operating twelfth processor among the plurality of processors;

causing the fourth virtual machine to be terminated; and separating the fourth storage device from the fourth virtual machine.

* * * * *